(12) United States Patent
Miyazaki

(10) Patent No.: US 10,315,709 B2
(45) Date of Patent: Jun. 11, 2019

(54) WORKING VEHICLE

(71) Applicant: YANMAR CO., LTD., Osaka-shi, Osaka (JP)

(72) Inventor: Ryuuichi Miyazaki, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 153 days.

(21) Appl. No.: 15/278,277

(22) Filed: Sep. 28, 2016

(65) Prior Publication Data
US 2017/0015368 A1    Jan. 19, 2017

Related U.S. Application Data

(63) Continuation of application No. PCT/JP2015/059524, filed on Mar. 26, 2015.

(30) Foreign Application Priority Data

Mar. 28, 2014  (JP) ................................ 2014-070505
Mar. 28, 2014  (JP) ................................ 2014-070506
Mar. 31, 2014  (JP) ................................ 2014-071937

(51) Int. Cl.
| B62D 33/00 | (2006.01) |
| B62D 33/06 | (2006.01) |
| B62D 49/00 | (2006.01) |
| B62D 21/18 | (2006.01) |

(Continued)

(52) U.S. Cl.
CPC ..... B62D 33/0617 (2013.01); B60H 1/00378 (2013.01); B60K 13/04 (2013.01);
(Continued)

(58) Field of Classification Search
CPC ...... B60D 33/044; B60D 25/10; B60D 25/14; B60D 211/186; B60D 25/06; B60D 49/00;
(Continued)

(56) References Cited

U.S. PATENT DOCUMENTS 5,495,910 A * 3/1996 Stauffer ................ B62D 25/10
                                                        123/41.7
5,634,525 A * 6/1997 Templeton ............ B62D 25/10
                                                        180/69.24

(Continued)

FOREIGN PATENT DOCUMENTS

| JP | 7-024686 U | 5/1995 |
| JP | 8-020360 A | 1/1996 |

(Continued)

*Primary Examiner* — Hau V Phan
(74) *Attorney, Agent, or Firm* — Norton Rose Fulbright US LLP

(57) ABSTRACT

A working vehicle includes a cabin. the cabin, which covers a steering seat disposed on a travelling machine body, includes a cabin frame constituting a framework of the cabin, and a roof assembly disposed on the upper end side of the cabin frame. A tailpipe is disposed on one side among a left side and a right side of the travelling machine body. Exhaust gas from an engine, mounted on the travelling machine body, is discharged to the outside through the tailpipe. The roof assembly is partitioned into a front-side chamber and a rear-side chamber, and an air conditioner is contained in a rear-side chamber side. An external-air intake opening is formed on one side opposite the tailpipe among a left side and a right side of the roof assembly.

7 Claims, 36 Drawing Sheets

(51) Int. Cl.
  *B60H 1/00* (2006.01)
  *B60K 13/04* (2006.01)
  *B60Q 1/02* (2006.01)
  *B60Q 1/26* (2006.01)
  *B62D 25/04* (2006.01)
  *B62D 25/06* (2006.01)
  *B62D 55/02* (2006.01)
  *B60Q 1/00* (2006.01)
  *B60Q 1/04* (2006.01)
  *B60Q 1/18* (2006.01)
  *B60Q 1/24* (2006.01)

(52) U.S. Cl.
  CPC ............... *B60Q 1/02* (2013.01); *B60Q 1/26* (2013.01); *B62D 21/186* (2013.01); *B62D 25/04* (2013.01); *B62D 25/06* (2013.01); *B62D 49/00* (2013.01); *B62D 55/02* (2013.01); *B60Q 1/0035* (2013.01); *B60Q 1/0483* (2013.01); *B60Q 1/18* (2013.01); *B60Q 1/24* (2013.01); *B60Q 1/2657* (2013.01)

(58) Field of Classification Search
  CPC ...... B60D 55/02; B60D 33/00; B60K 17/043; B60K 11/08; B60K 17/04
  See application file for complete search history.

(56) References Cited

U.S. PATENT DOCUMENTS

| | | | | |
|---|---|---|---|---|
| 6,167,977 | B1 * | 1/2001 | Adamson | B62D 25/10 16/289 |
| 7,520,364 | B2 * | 4/2009 | Oka | B60K 17/04 180/291 |
| 8,100,212 | B2 * | 1/2012 | Sawai | B62D 25/14 180/69.2 |
| 8,371,408 | B2 * | 2/2013 | Kawashiri | B62D 25/10 180/69.21 |
| 9,416,701 | B2 * | 8/2016 | Morimoto | F01N 3/00 |
| 2004/0209718 | A1 * | 10/2004 | Ishibashi | B60W 10/103 474/18 |
| 2005/0211487 | A1 * | 9/2005 | Obe | B60K 11/08 180/69.21 |
| 2009/0127007 | A1 * | 5/2009 | Tsujita | B60K 17/043 180/6.3 |
| 2010/0164251 | A1 * | 7/2010 | Itou | B62D 33/044 296/205 |
| 2011/0316309 | A1 * | 12/2011 | Kawashiri | A01D 67/02 296/210 |
| 2014/0083791 | A1 * | 3/2014 | Togo | F01N 13/1811 180/309 |

FOREIGN PATENT DOCUMENTS

| | | |
|---|---|---|
| JP | 8-133123 A | 5/1996 |
| JP | 1159502 A | 3/1999 |
| JP | 2002-067657 A | 3/2002 |
| JP | 2002-087041 A | 3/2002 |
| JP | 2002-347435 A | 12/2002 |
| JP | 2003-127902 A | 5/2003 |
| JP | 2004-345367 A | 12/2004 |
| JP | 2007-308031 A | 11/2007 |
| JP | 2008-007055 A | 1/2008 |
| JP | 2011-042304 A | 3/2011 |
| JP | 2011-046303 A | 3/2011 |
| JP | 2012-126346 A | 7/2012 |
| JP | 2012129667 A | 7/2012 |

* cited by examiner

WORKING VEHICLE

CROSS-REFERENCE TO RELATED APPLICATIONS

The present application is a continuation application of International Application No. PCT/JP2015/059524, filed Mar. 26, 2015, which claims priority to Japanese Patent Application No. 2014-070505, filed Mar. 28, 2014, Japanese Patent Application No. 2014-070506, filed Mar. 28, 2014, and Japanese Patent Application No. 2014-071937, filed Mar. 31, 2014. The contents of these applications are incorporated herein by reference in their entirety.

BACKGROUND OF THE INVENTION

The present invention relates to working vehicles.

Generally, a working vehicle, such as a tractor for use in agricultural work, includes a cabin covering a steering seat disposed on a travelling machine body (see, for example, Japanese Unexamined Patent Application Publication No. 2002-67657 and Japanese Unexamined Patent Application Publication No. 2004-345367). A cabin disclosed in Japanese Unexamined Patent Application Publication No. 2002-67657 includes a cabin frame constituting a framework of the cabin, and a roof assembly disposed on the upper end side of the cabin frame. The cabin frame has a so-called frame structure in which pillars and beams are combined and the rigidity is ensured by these pillars and beams.

SUMMARY OF THE INVENTION

In a working vehicle of this kind, light fitments, such as a front composite light and a working light, are attached to the cabin. In this attachment of the light fitments, there is a need for taking it into consideration to allow visibility in front, rear, left, and right directions from the inside of the cabin to be favorably ensured without impairing the ease of assembling work in a production line. With respect to the structure of the cabin, demands for not only a cost reduction, but also improvements of the ease of operation of getting on/off the cabin and the comfort inside the cabin have been made.

It is an object of the present invention to provide a working vehicle on which technical improvements resulting from consideration of the above present situation have been made.

According to a first aspect of the present invention, a working vehicle includes a travelling machine body, a steering seat on the travelling machine body, an engine on the travelling machine body, a cabin covering the steering seat and including a cabin frame constituting a framework of the cabin, and a roof assembly disposed on an upper end of the cabin frame and including a front-side chamber and a rear-side chamber that are partitioned inside the roof assembly, an air conditioner inside the rear-side chamber, a tailpipe disposed on one side among a left side and a right side of the travelling machine body and configured to allow exhaust gas from the engine to be discharged to an outside of the working vehicle through the tailpipe, and an external-air intake opening disposed on one side opposite the tailpipe among a left side and a right side of the roof assembly and configured to bring the rear-side chamber into communication with the outside of the working vehicle.

According to a second aspect of the present invention, in the working vehicle according to the first aspect of the present invention, the cabin frame may include a pair of left and right front support pillars, a pair of left and right rear support pillars, a front beam coupling upper end portions of the left and right front support pillars, a rear beam coupling upper end portions of the left and right rear support beams, and side beams including a left side-beam coupling between upper end portions of the left front support pillar and the left rear support pillar, which are arranged in a front and rear direction, and including a right side-beam coupling between upper end portions of the right front support pillar and the right rear support pillar, which are arranged in the front and rear direction. Further, the rear-side chamber of the roof assembly may be disposed so as to protrude from the rear beam, and may be supported by the rear beam. A rear upper-side working light may be attached to a support stay disposed on an upper end side of each of the left and right rear support pillars.

According to a third aspect of the present invention, in the working vehicle according to the first aspect of the present invention, at least one support stay to each of which at least one light fitment is attached may be disposed on the cabin frame.

According to a fourth aspect of the present invention, in the working vehicle according to the third aspect of the present invention, the at least one support stay may include a plurality of support stays, and the at least one light fitment may include a plurality of light fitments, and the cabin frame may include a pair of left and right front support pillars, a pair of left and right rear support pillars, a front beam coupling between end portions of the left and right front support pillars, a rear beam coupling between end portions of the left and right rear support beams, and side beams including a left side-beam coupling between upper end portions of the left front support pillar and the left rear support pillar, which are arranged in a front and rear direction, and including a right side-beam coupling between upper end portions of the right front support pillar and the right rear support pillar, which are arranged in the front and rear direction. Further, a first one of the plurality of support stays may be disposed on an upper-lower direction intermediate portion of each of the front support pillars, and a front composite light and a front intermediate-side working light that serve as light fitments among the plurality of light fitments may be attached to the first one of the plurality of support stays. A second one of the plurality of support stays may be disposed on a lower portion of each of the rear support pillars, and a rear composite light and a rear lower-side working light that serve as light fitments among the plurality of light fitments may be attached to the second one of the plurality of support stays.

According to a fifth aspect of the present invention, in the working vehicle according to the first aspect of the present invention, the cabin frame may include a pair of left and right front support pillars, a pair of left and right rear support pillars, a front beam coupling between end portions of the left and right front support pillars, a rear beam coupling between end portions of the left and right rear support beams, and side beams including a left side-beam coupling between upper end portions of the left front support pillar and the left rear support pillar, which are arranged in a front and rear direction, and including a right side-beam coupling between upper end portions of the right front support pillar and the right rear support pillar, which are arranged in the front and rear direction. Further, a pair of left and right first support stays may be each disposed on a corresponding one of long-length direction intermediate portions of the front beam, and front upper-side working lights may be each attached to a corresponding one of the left and right first support stays. Second support stays may be disposed on an upper end portion of a corresponding one of the rear support pillars, and rear upper-side working lights may be each attached to a corresponding one of the second support stays.

According to a sixth aspect of the present invention, in the working vehicle according to the fifth aspect of the present invention, the front upper-side working lights may be located so as to overlap the front beam in a front view.

According to the embodiment of the first aspect of the present invention, in the working vehicle including the cabin, which covers the steering seat on the travelling machine body and includes the cabin frame constituting a framework of the cabin, and the roof assembly disposed on the upper end of the cabin frame, the tailpipe, through which exhaust gas from the engine mounted on the travelling machine body is discharged to the outside of the working vehicle, is disposed on one side among a left side and a right side of the travelling machine body. Further, the inside of the roof assembly is partitioned into the front-side chamber and the rear-side chamber, which are partitioned inside the roof assembly. The air conditioner is contained inside the rear-side chamber. The external-air intake opening, which brings the rear-side chamber into communication with the outside of the working vehicle, is disposed in one side opposite the tailpipe among a left side and a right side of the roof assembly. Accordingly, this configuration significantly reduces the possibility that the exhaust gas, discharged through the tailpipe, is taken into the external-air intake opening.

According to the embodiment of the second aspect of the present invention, the cabin frame includes the pair of left and right front support pillars, the pair of left and right rear support pillars, the front beam, coupling between upper end portions of the left and right front support pillars, the rear beam, coupling between upper end portions of the left and right rear support beams, and the side beams, including a left side-beam coupling between end portions of the left front support pillar and the left rear support pillar, which are arranged in a front and rear direction, and including a right side-beam coupling between upper end portions of the right front support pillar and the right rear support pillar, which are arranged in the front and rear direction. Further, the rear-side chamber of the roof assembly is disposed so as to protrude from the rear beam, and is supported by the rear beam. Further, the rear upper-side working light is attached to the support stay, disposed on an upper end side of each of the left and right rear support pillars. Accordingly, this configuration enables the air conditioner to be disposed in the inside of the roof assembly without increasing the entire height of the cabin, and further, eliminates a situation in which a configuration in which the air conditioner is contained in the rear-side chamber of the roof assembly restricts front visibility from an operator. Further, the configuration, which allows the rear upper-side working light to be attached to the support stay, disposed on the upper end side of each of the rear support pillars, not only enables a disposition space at the side of the rear-side chamber of the roof assembly to be formed between the support stays for both of the upper-side working lights, but also enables rear visibility from an operator to be favorably ensured.

According to the embodiment of the third aspect of the present invention, the at least one support stay to each of which at least one light fitment is attached is disposed on the cabin frame, and thus, this configuration enables the at least one light fitment to be directly attached to the cabin frame. This configuration, therefore, contributes to improvement of the ease of assembling work in a production line, and thus, enables a cost reduction.

According to the embodiment of the fourth aspect of the present invention, the cabin frame includes the pair of left and right front support pillars, the pair of left and right rear support pillars, the front beam, coupling between upper end portions of the left and right front support pillars, the rear beam, coupling between upper end portions of the left and right rear support beams, and the side beams, including a left side-beam coupling between end portions of the left front support pillar and the left rear support pillar, which are arranged in a front and rear direction, and including a right side-beam coupling between upper end portions of the right front support pillar and the right rear support pillar, which are arranged in the front and rear direction. Further, the front composite light and the front intermediate-side working light, which serve as light fitments among the light fitments, are attached to each of the support stays, which is disposed in an upper-lower direction intermediate portion of a corresponding one of the front support pillars. Moreover, the rear composite light and the rear intermediate-side working light, which serve as light fitments among the light fitments, are attached to each of the support stays, which is disposed in a lower portion of a corresponding one of the rear support pillars. Accordingly, this configuration enables the front composite light and the front intermediate-side working light to be integrally attached to each of the support stays, which is disposed on a corresponding one of the front support pillars, and enables the rear composite light and the rear lower-side working light to be integrally attached to each of the support stays, which is disposed on a corresponding one of the rear support pillars. That is, each of the support stays is used in common for the plurality of light fitments, and this configuration contributes to reduction of the number of components. Further, this configuration facilitates routing cables for the plurality of light fitments. Moreover, this configuration facilitates ensuring visibility in front, rear, left, and right directions from the inside of the cabin.

According to the embodiment of the fifth aspect of the present invention, the cabin frame includes the pair of left and right front support pillars, the pair of left and right rear support pillars, the front beam, coupling between upper end portions of the left and right front support pillars, the rear beam, coupling between upper end portions of the left and right rear support beams, and the side beams, including a left side-beam coupling between end portions of the left front support pillar and the left rear support pillar, which are arranged in a front and rear direction, and including a right side-beam coupling between upper end portions of the right front support pillar and the right rear support pillar, which are arranged in the front and rear direction. Further, the front upper-side working lights are each attached to a corresponding one of the pair of left and right front upper-side support stays, which are disposed in long-length direction intermediate portions of the front beam, and the rear upper-side working lights are each attached to a corresponding one of the support stays, each disposed at the upper side of a corresponding one of the rear support pillars. Thus, this configuration enables the front upper-side working lights to be directly attached to the front beam, and enables the rear upper-side working lights to be directly attached to a corresponding one of the rear support pillars. This configuration, therefore, contributes to improvement of the ease of assembling work in a production line, and thus, enables a cost reduction. Additionally, this configuration makes unnecessary to attach the front upper-side working lights to the roof assembly, and to route the cables, and thus, makes it simple to assemble the roof assembly to the cabin frame. In this respect, similarly, this configuration contributes to improvement of the ease of assembling work in the production line.

According to the embodiment of the sixth aspect of the present invention, the front upper-side working light is located so as to overlap the front beam in a front view. Thus, this configuration significantly reduces the possibility that the front upper-side working light blocks front visibility from an operator sitting on the steering seat, and as a result, favorably ensures the front visibility from the operator.

DESCRIPTION OF THE EMBODIMENTS

Figure 1:
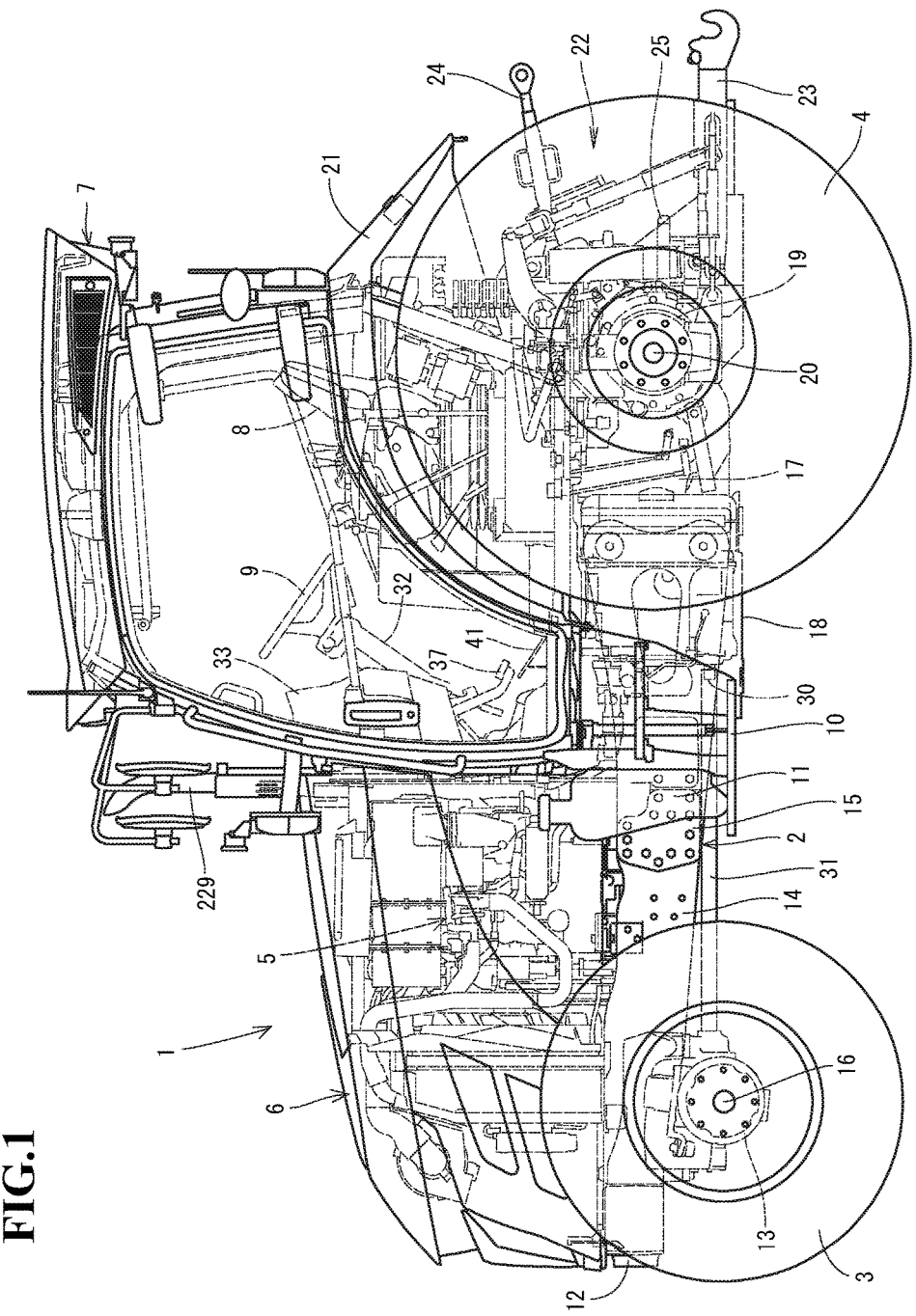
FIG. 1 is a left side view of a tractor.
Figure 2:
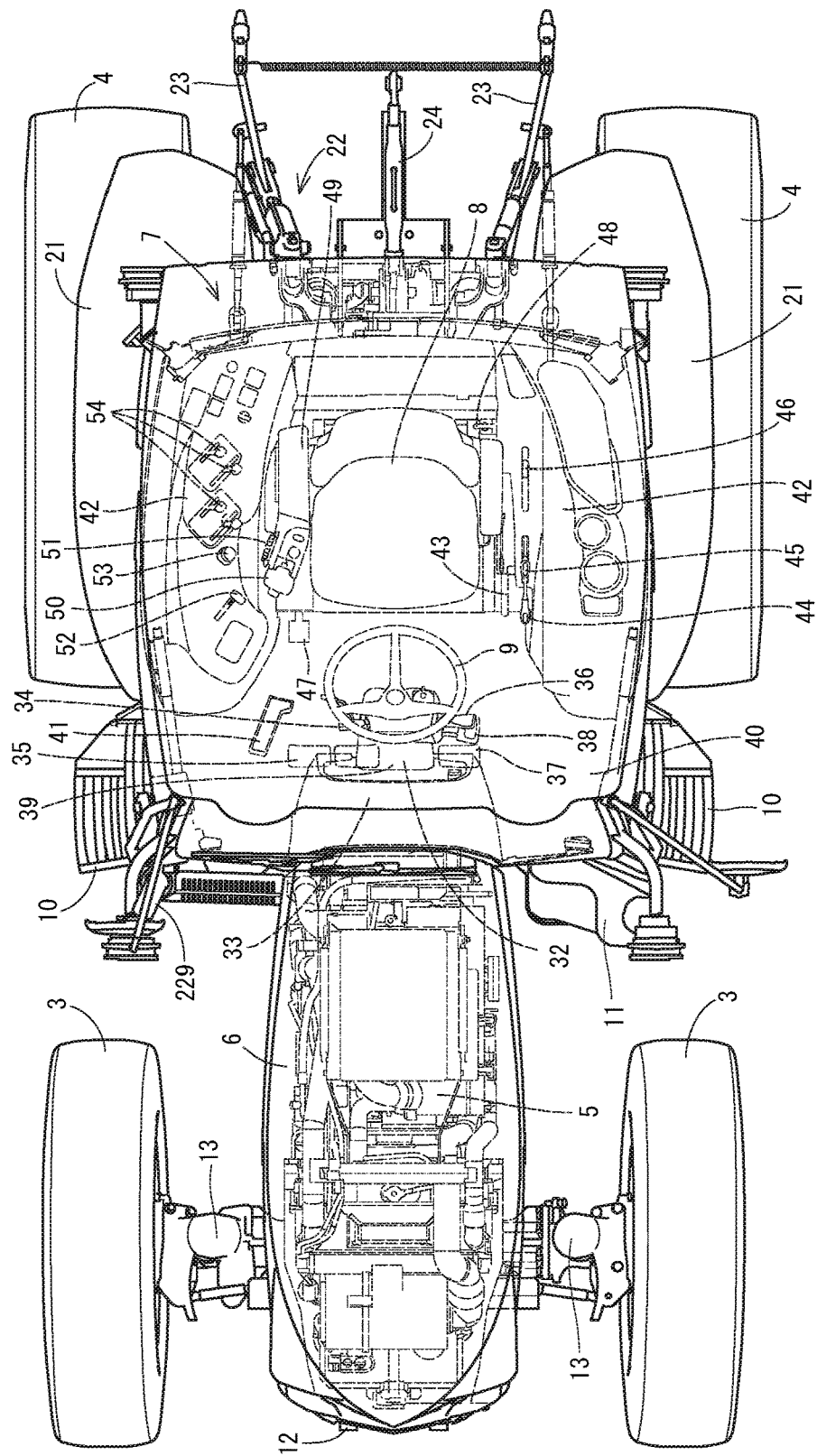
FIG. 2 is a plan view of the tractor.
Figure 3:
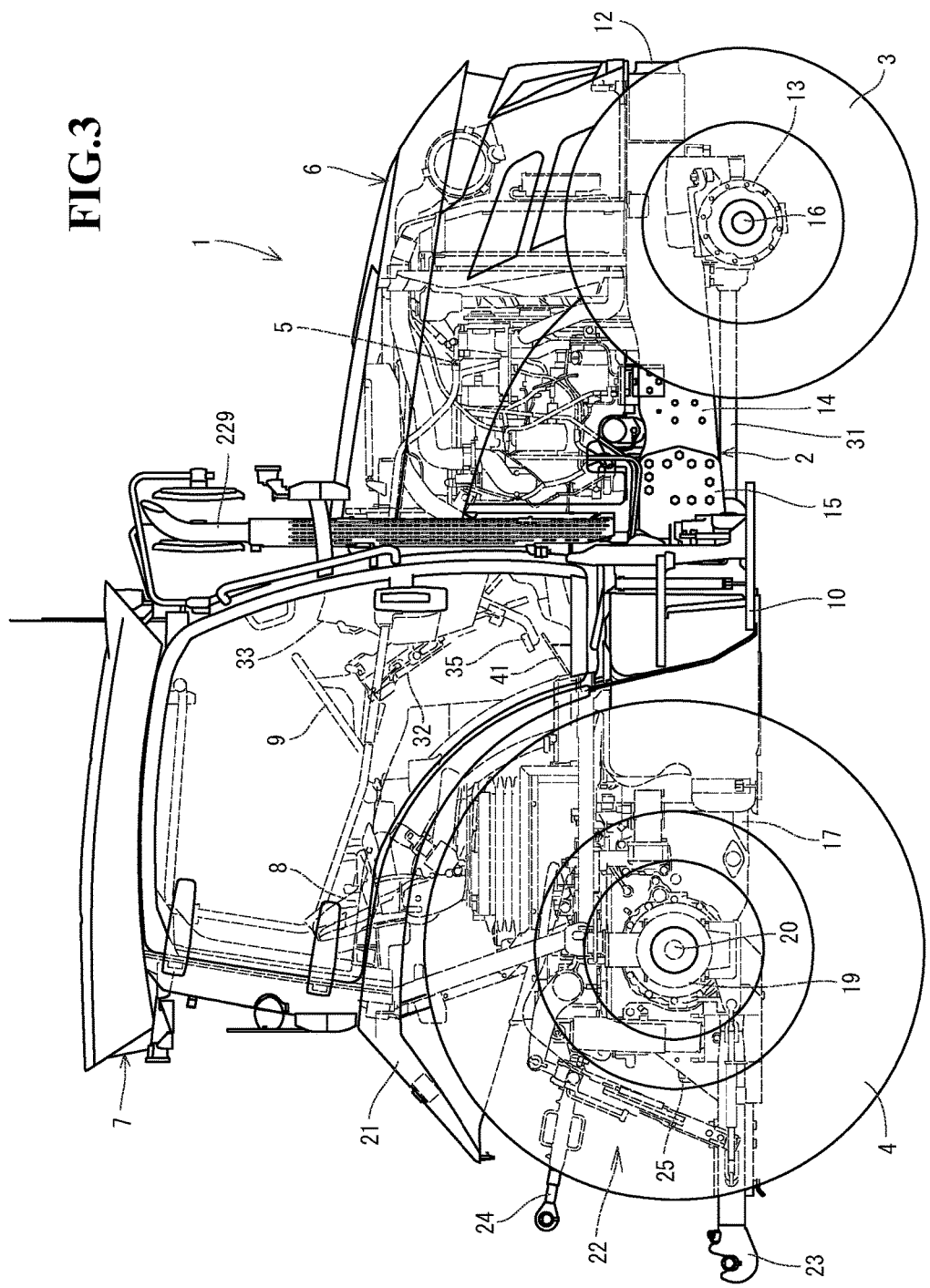
FIG. 3 is a right side view of the tractor.
Figure 4:
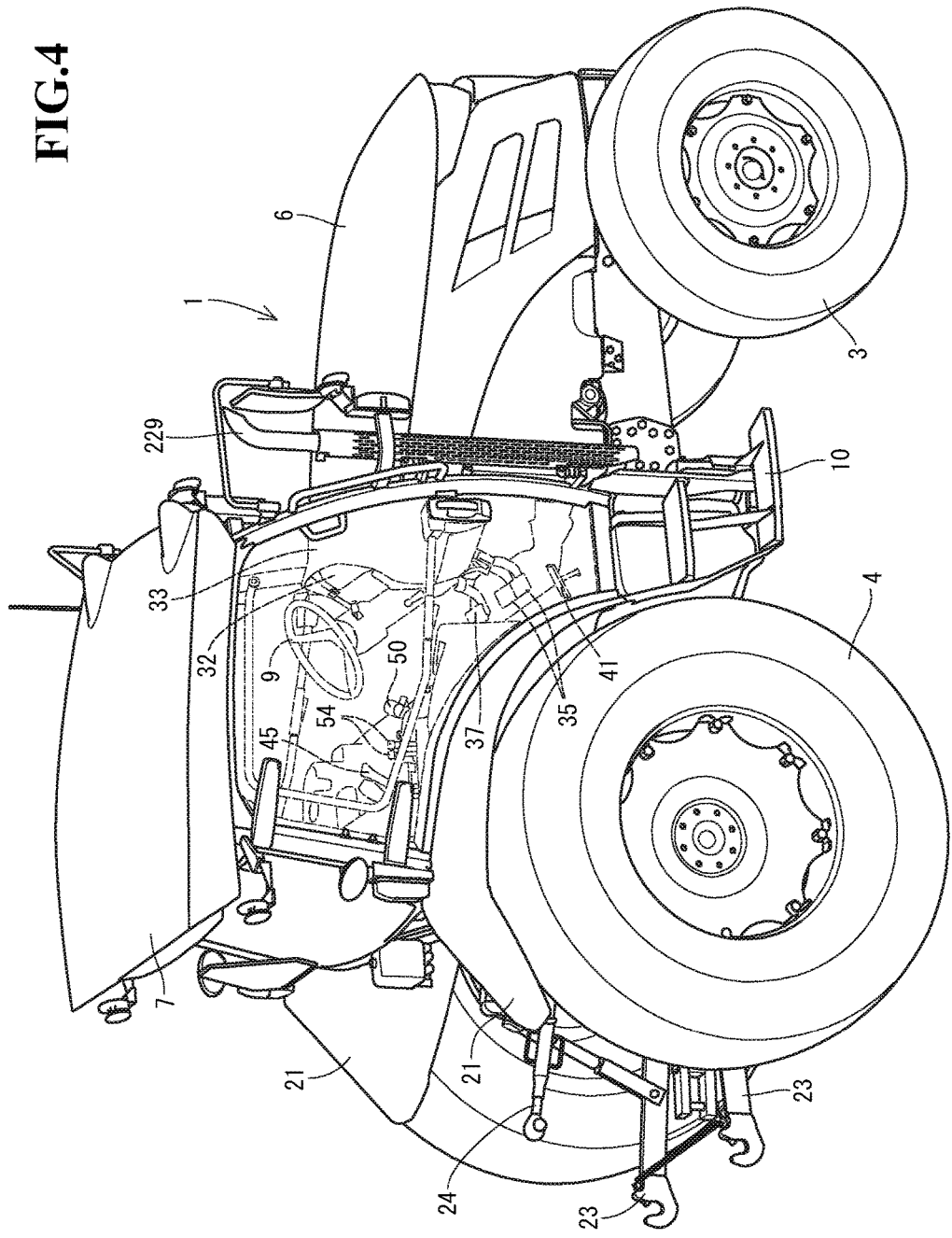
FIG. 4 is a perspective view of the tractor when obliquely viewed from a rear and right side.
Figure 5:
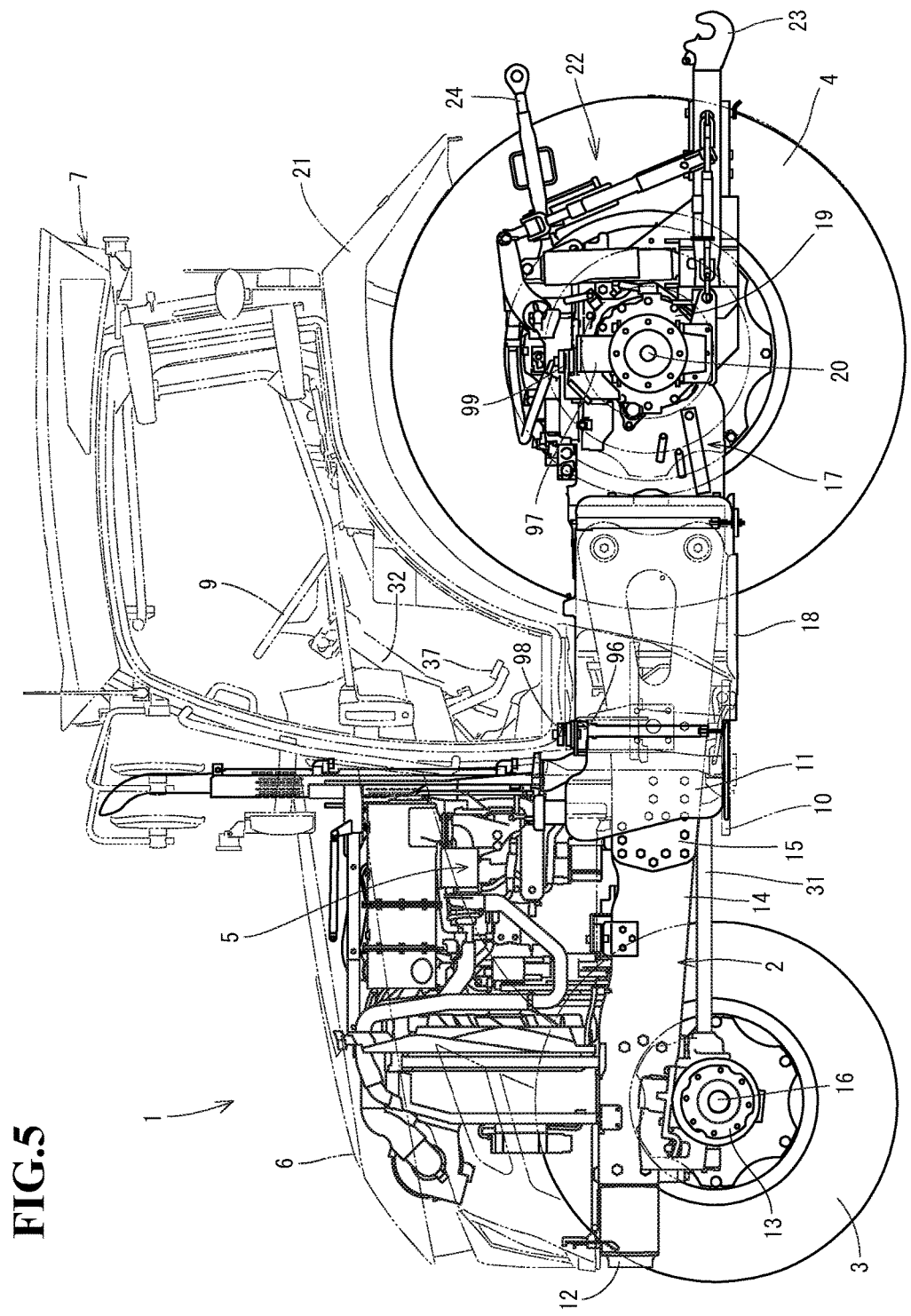
FIG. 5 is a left side view of a travelling machine body illustrating the structure of the travelling machine body.
Figure 6:
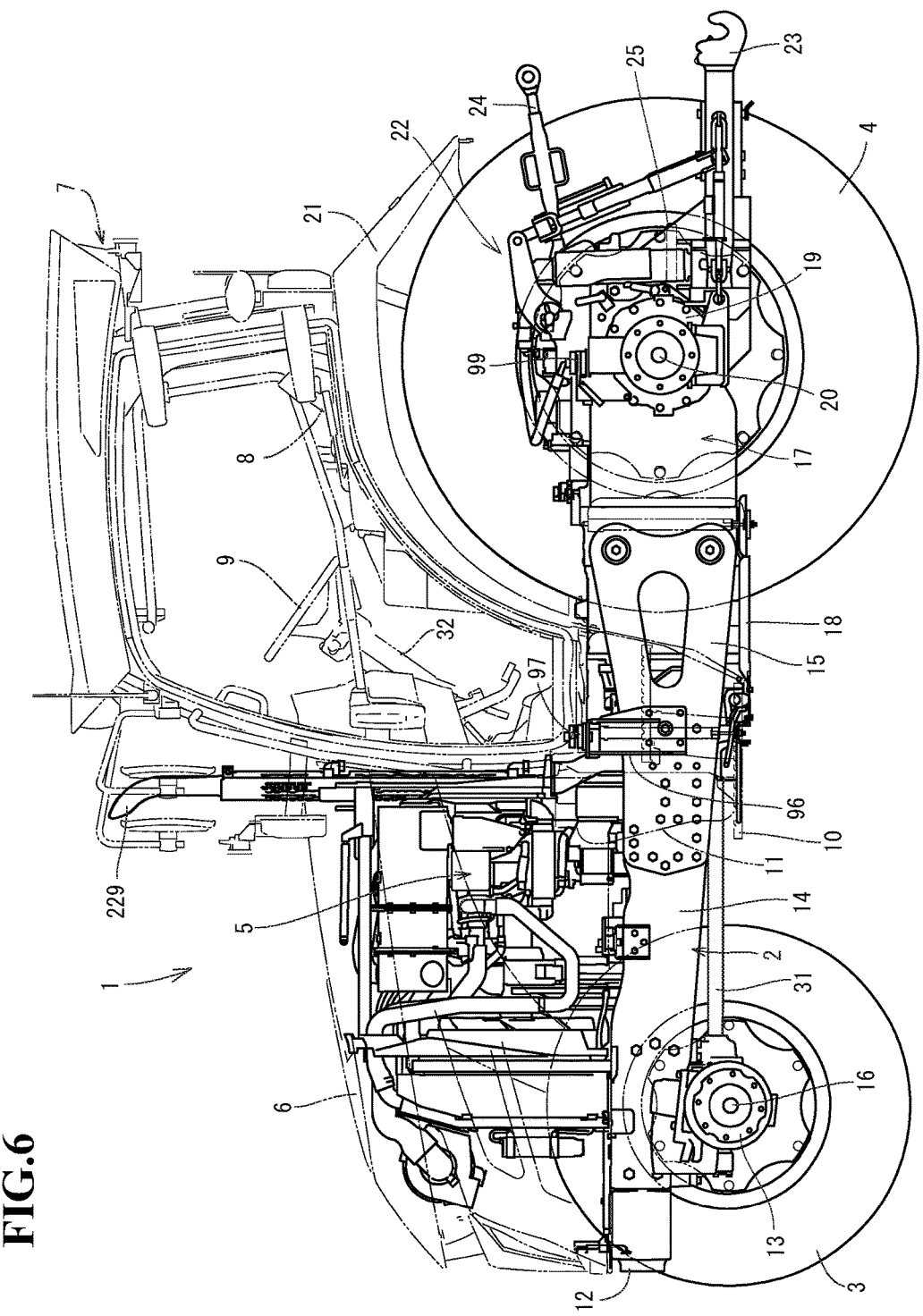
FIG. 6 is a left side view of the travelling machine body illustrating the details of the structure of the travelling machine body.
Figure 7:
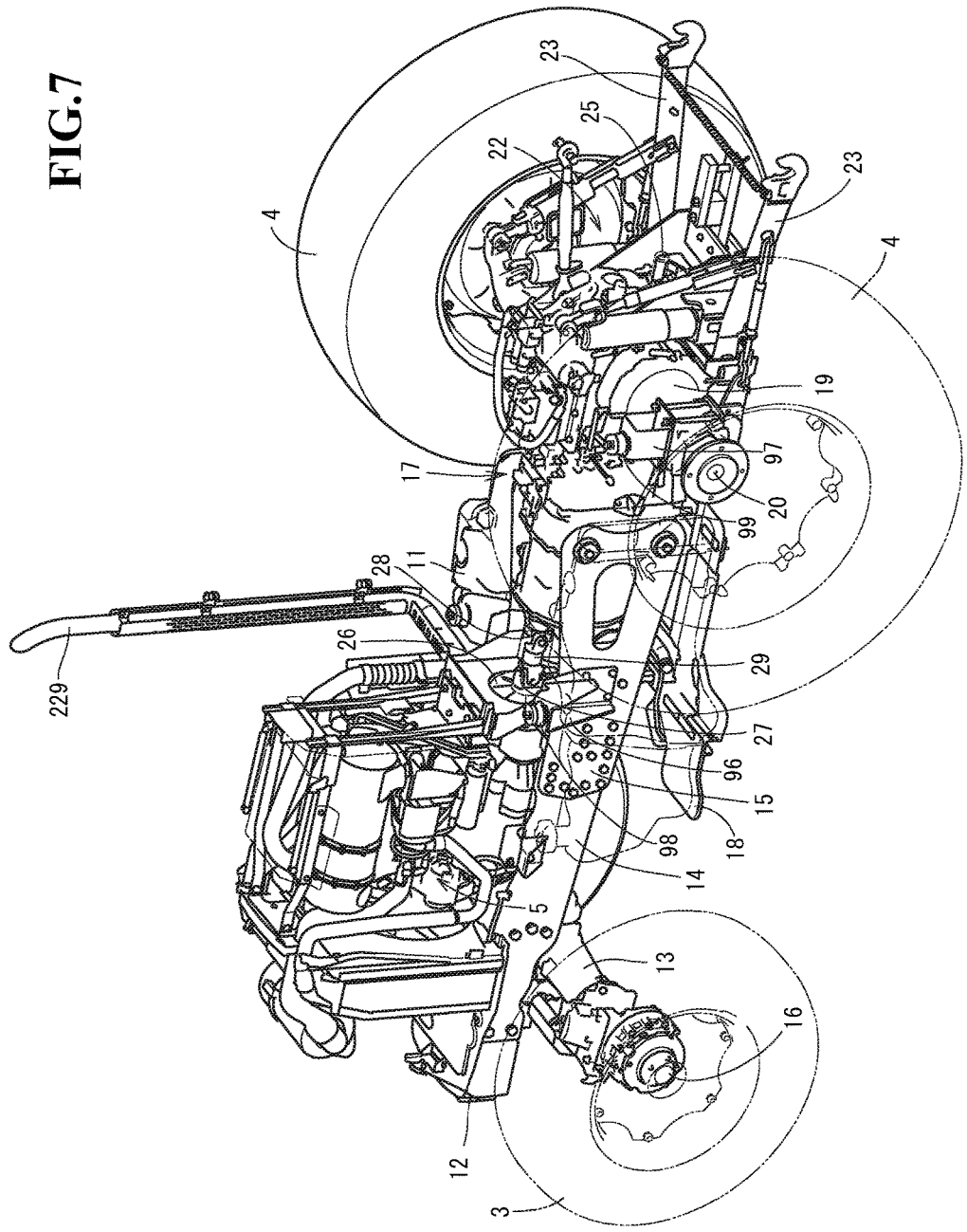
FIG. 7 is a perspective view of the travelling machine body when obliquely viewed from a rear and left side.
Figure 8:
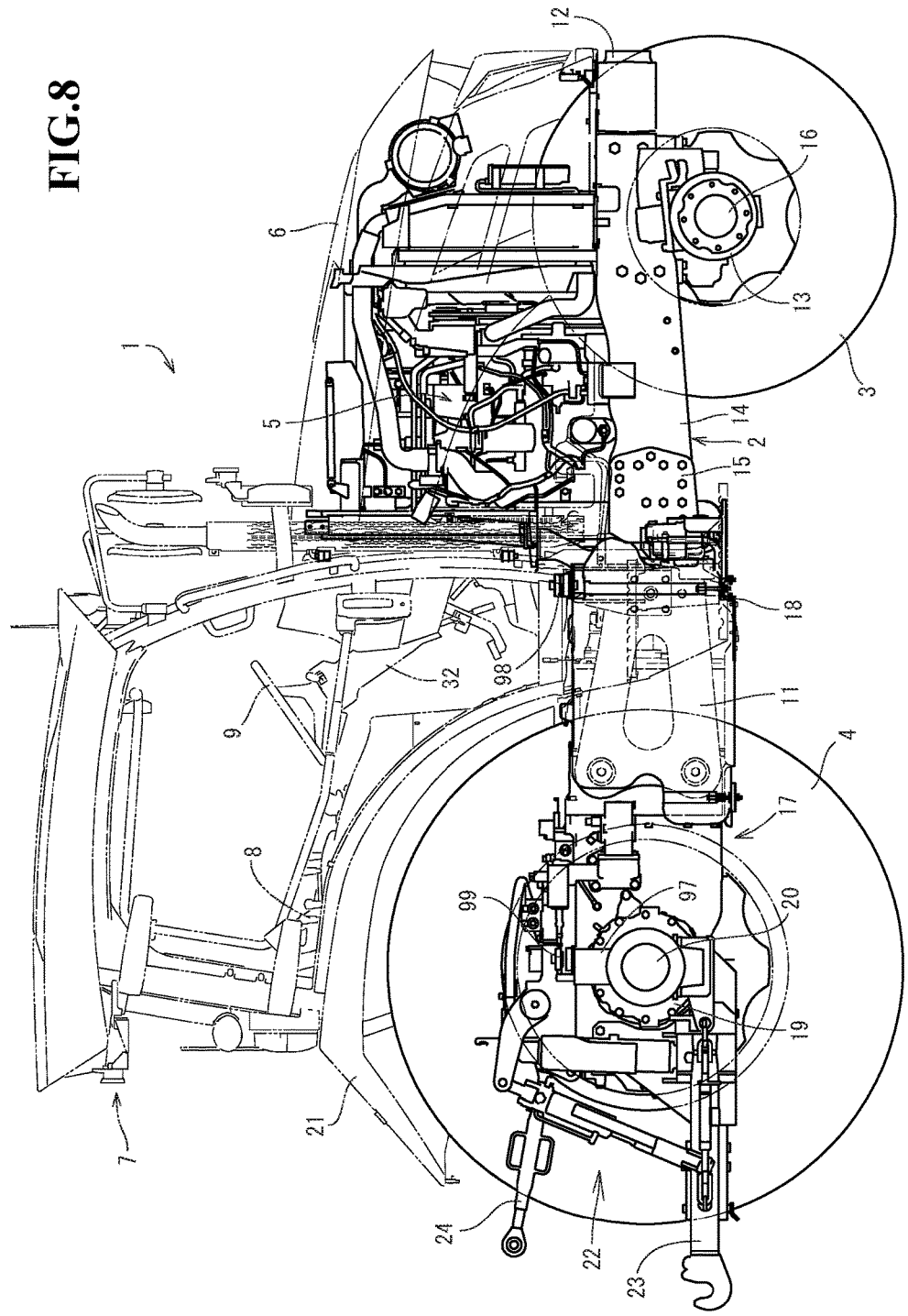
FIG. 8 is a right side view of the travelling machine body illustrating the structure of the travelling machine body.
Figure 9:
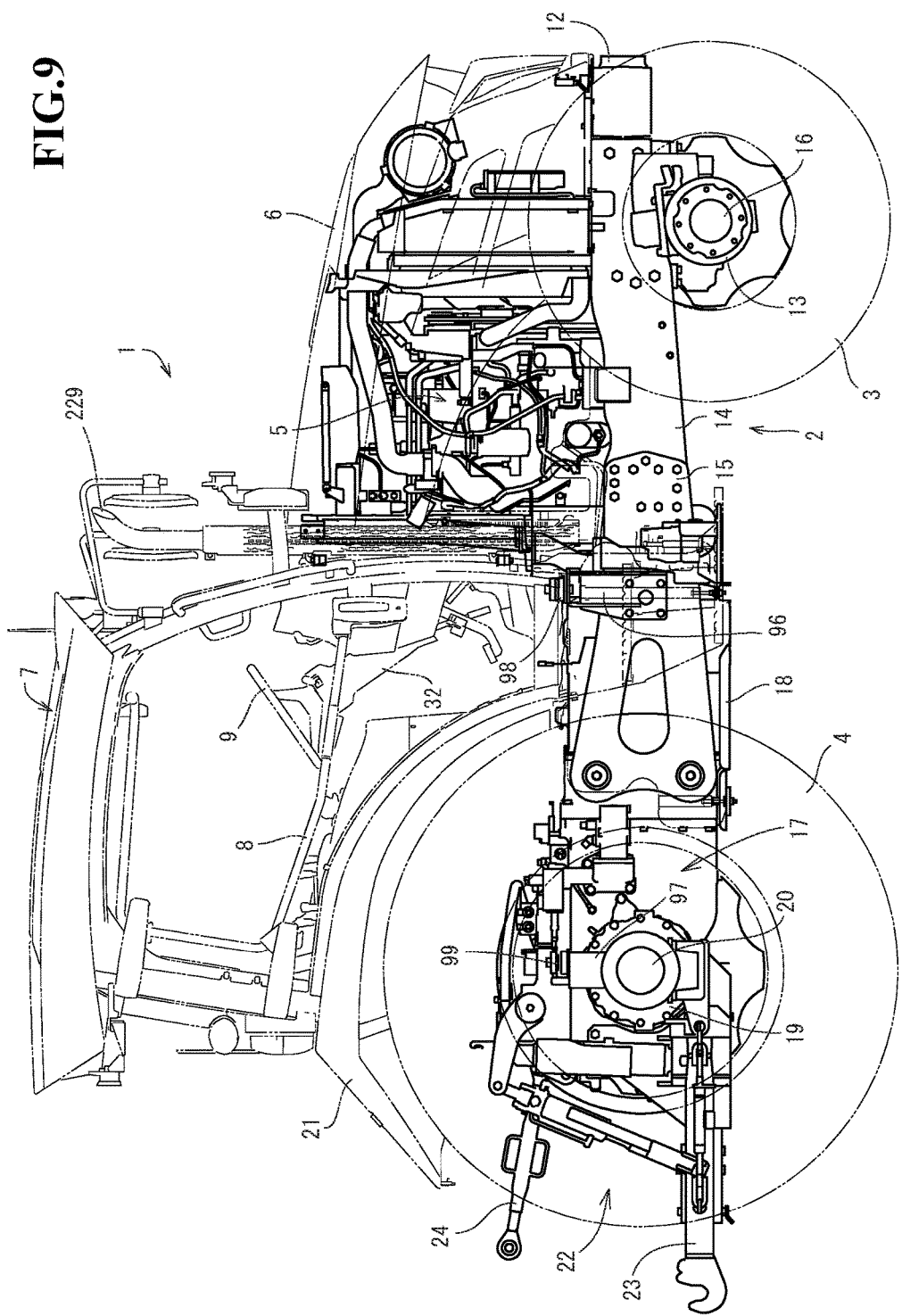
FIG. 9 is a right side view of the travelling machine body illustrating the details of the structure of the travelling machine body.
Figure 10:
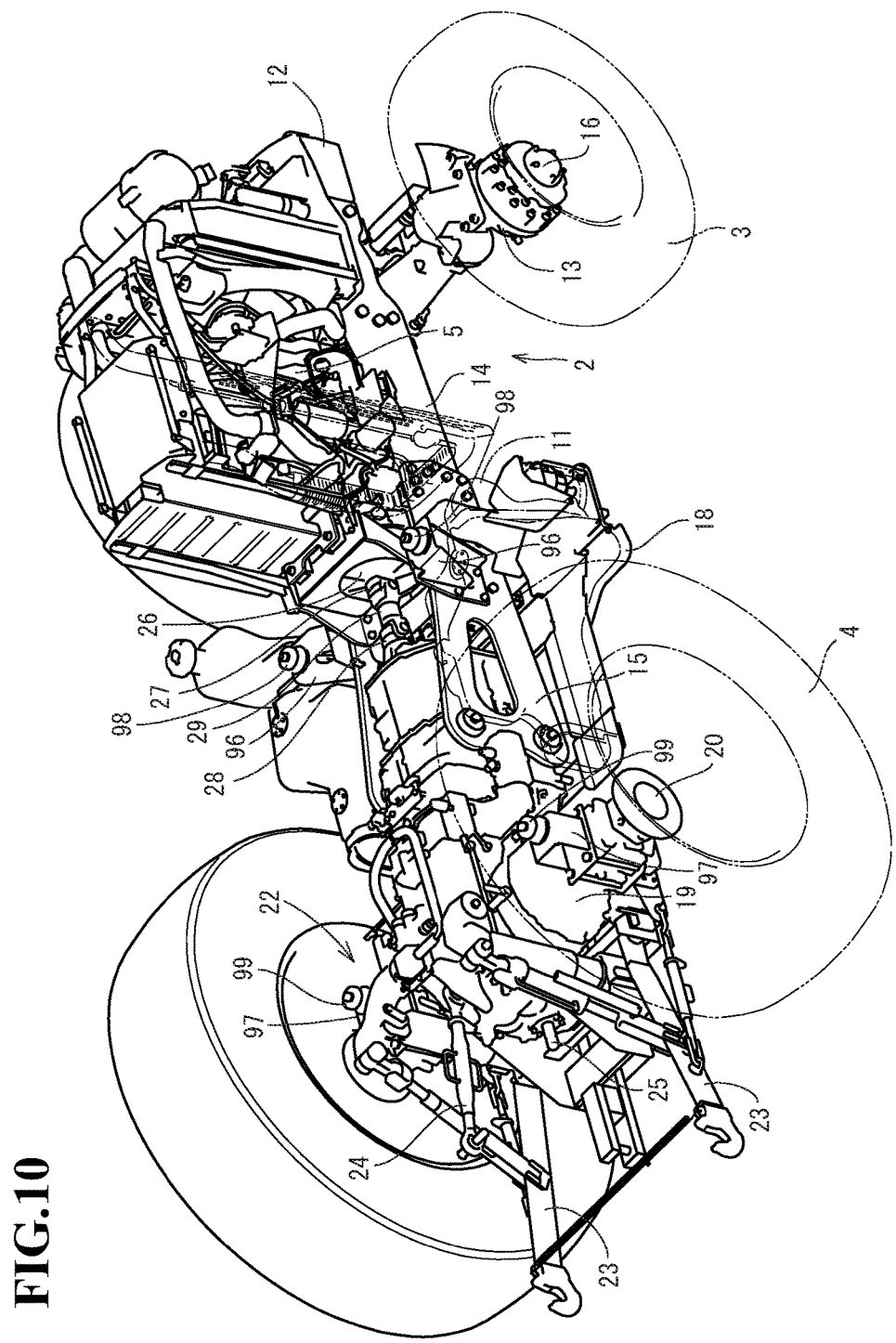
FIG. 10 is a perspective view of the travelling machine body when obliquely viewed from a rear and right side.
Figure 11:
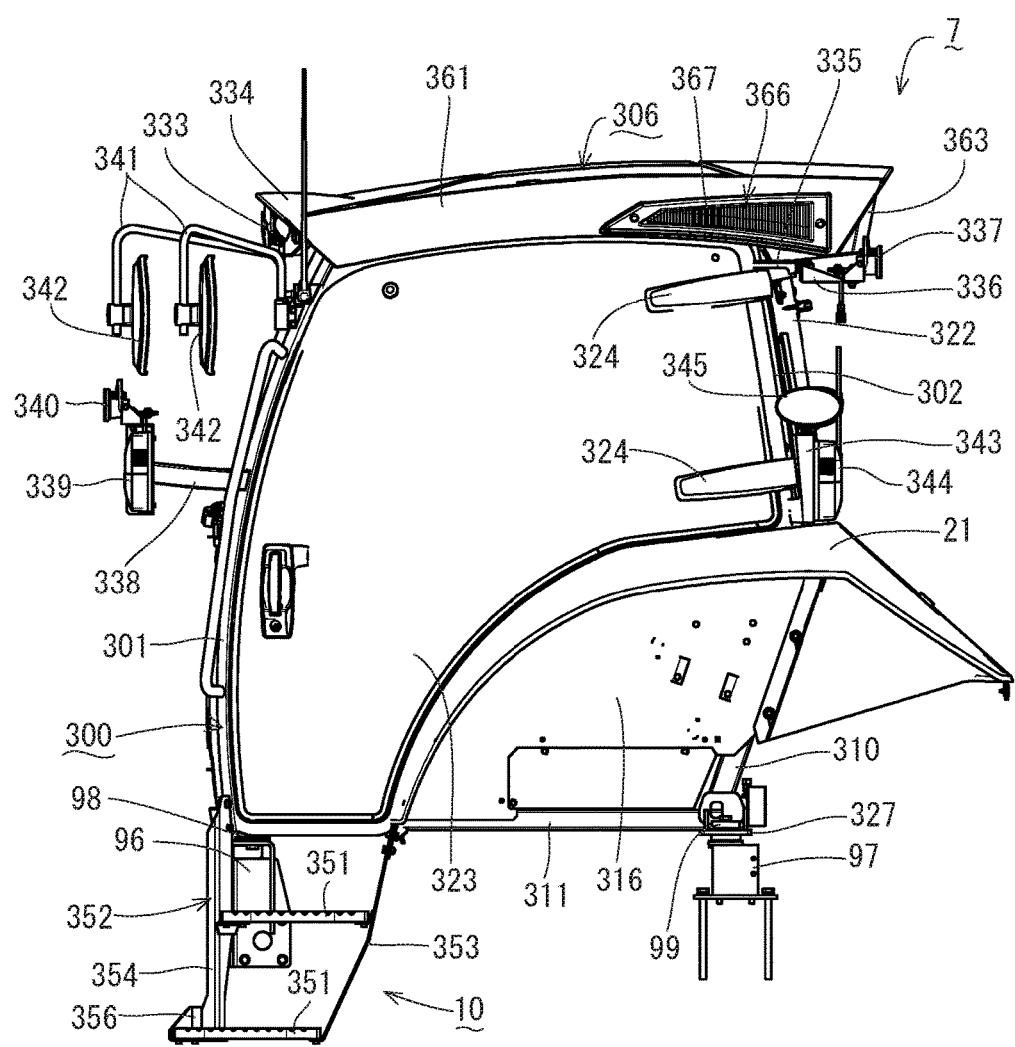
FIG. 11 is a left side view of a cabin.
Figure 12:
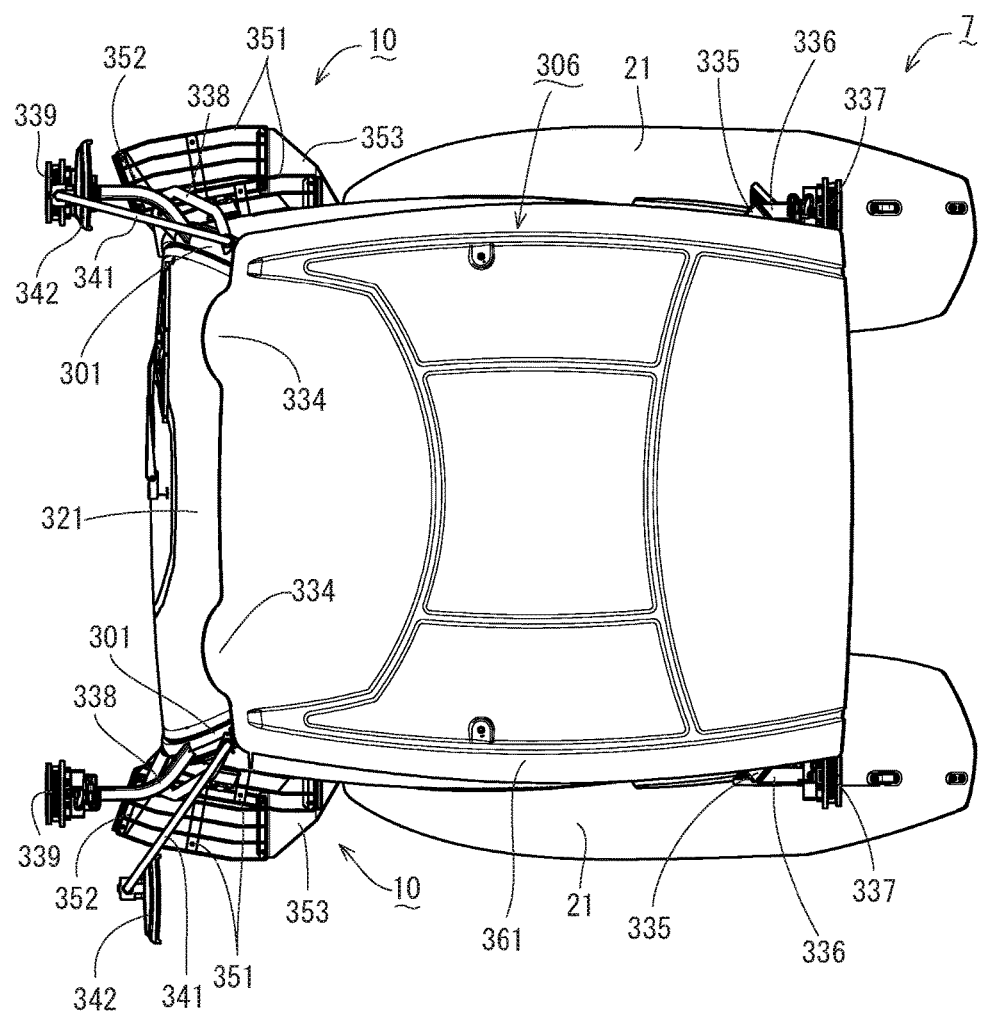
FIG. 12 is a plan view of the cabin.
Figure 13:
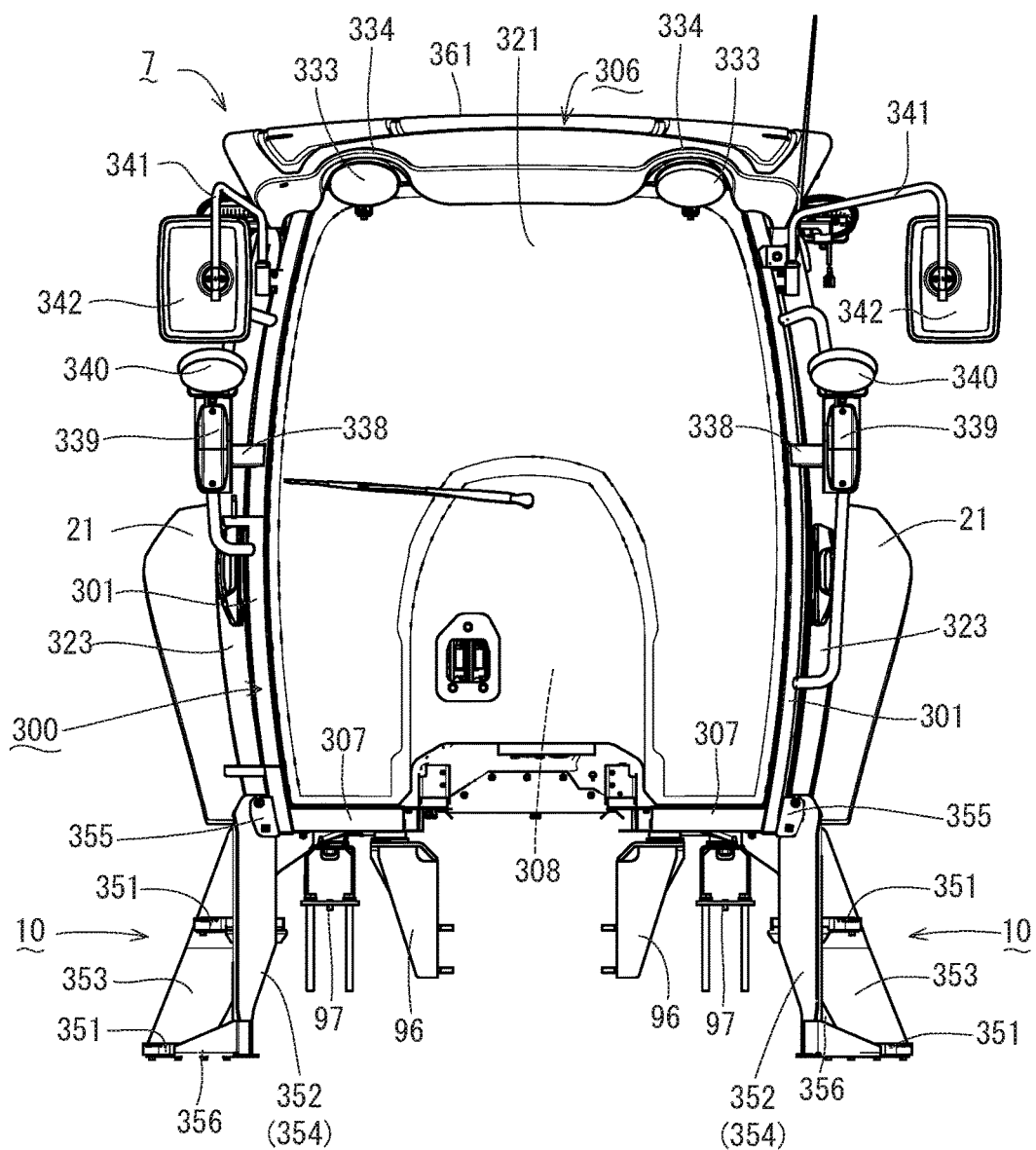
FIG. 13 is a front view of the cabin.
Figure 14:
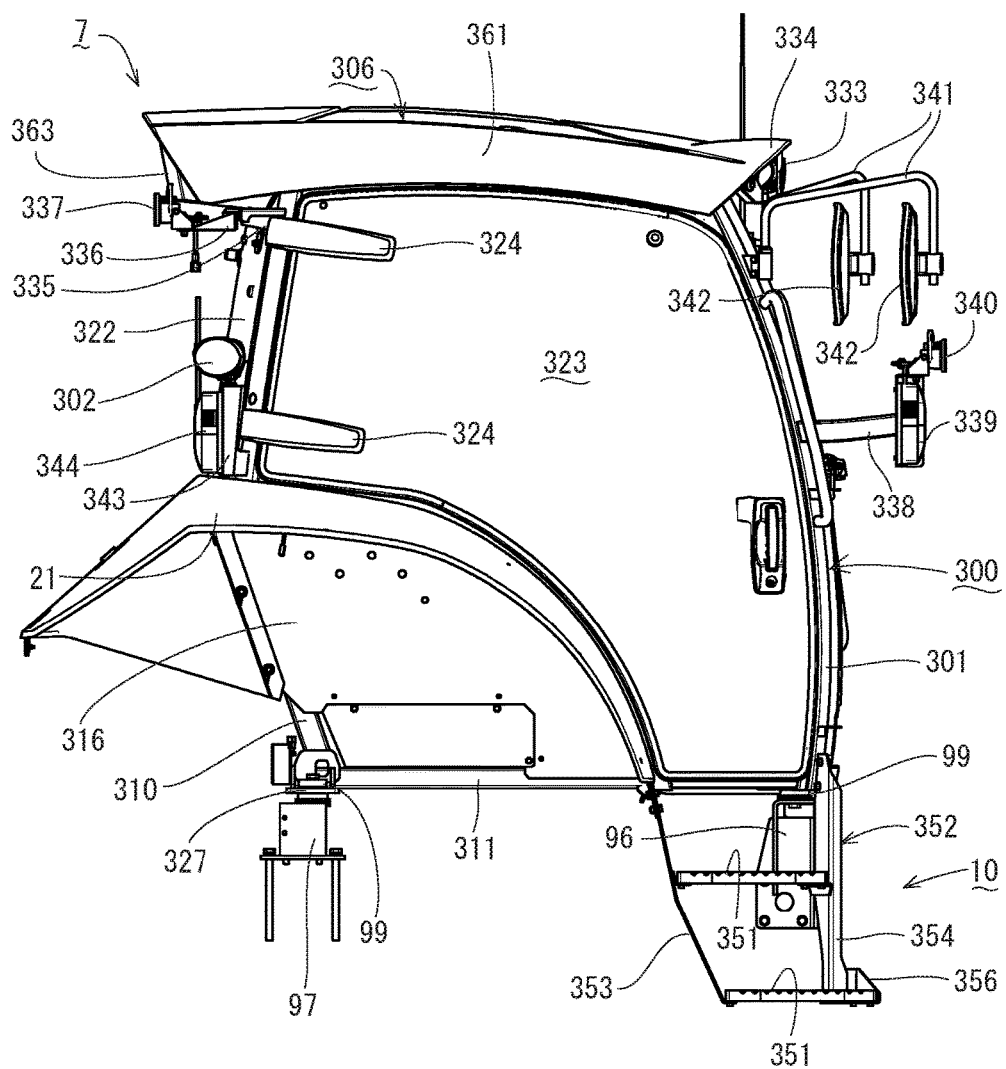
FIG. 14 is a right side view of the cabin.
Figure 15:
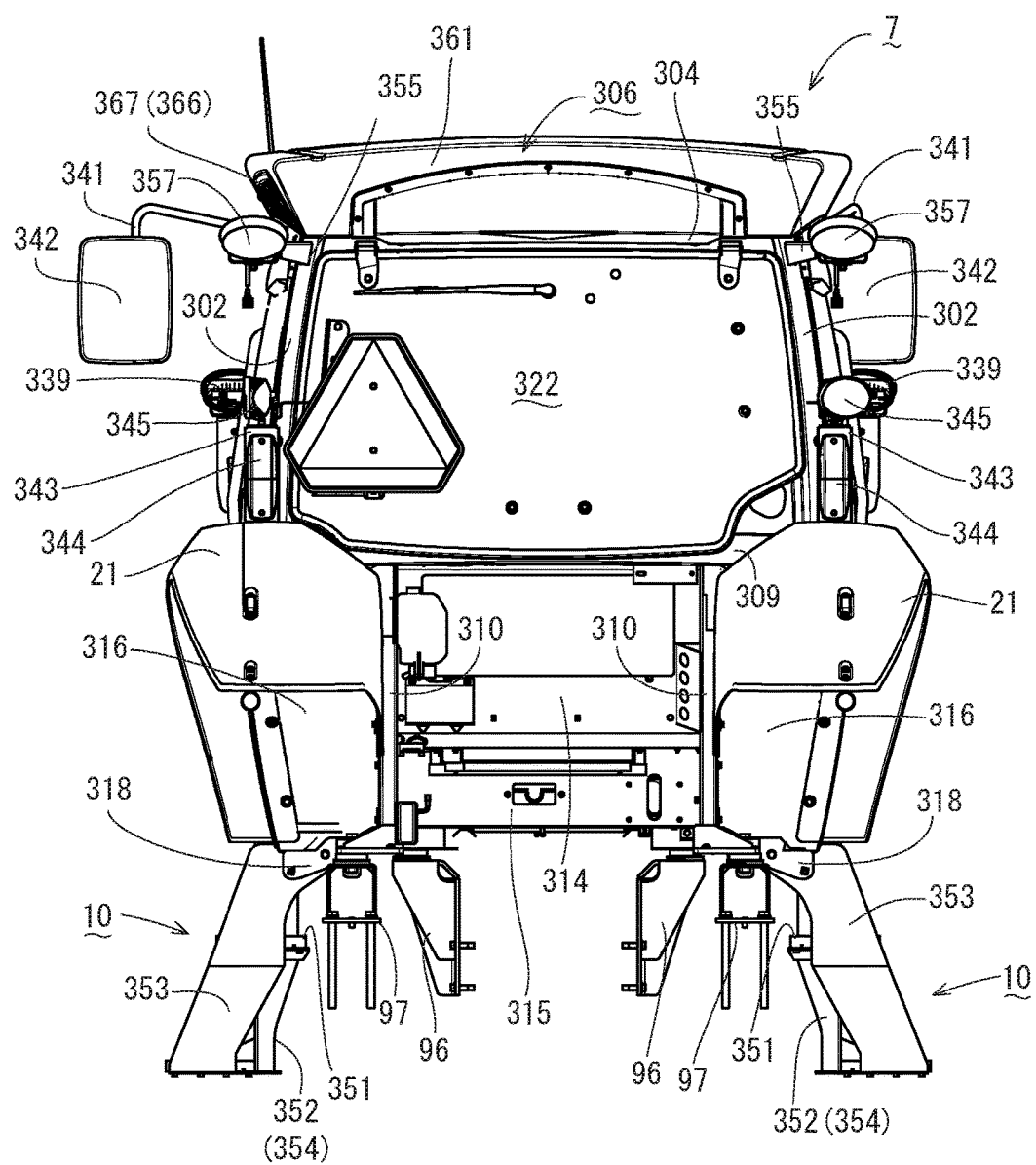
FIG. 15 is a rear view of the cabin.
Figure 16:
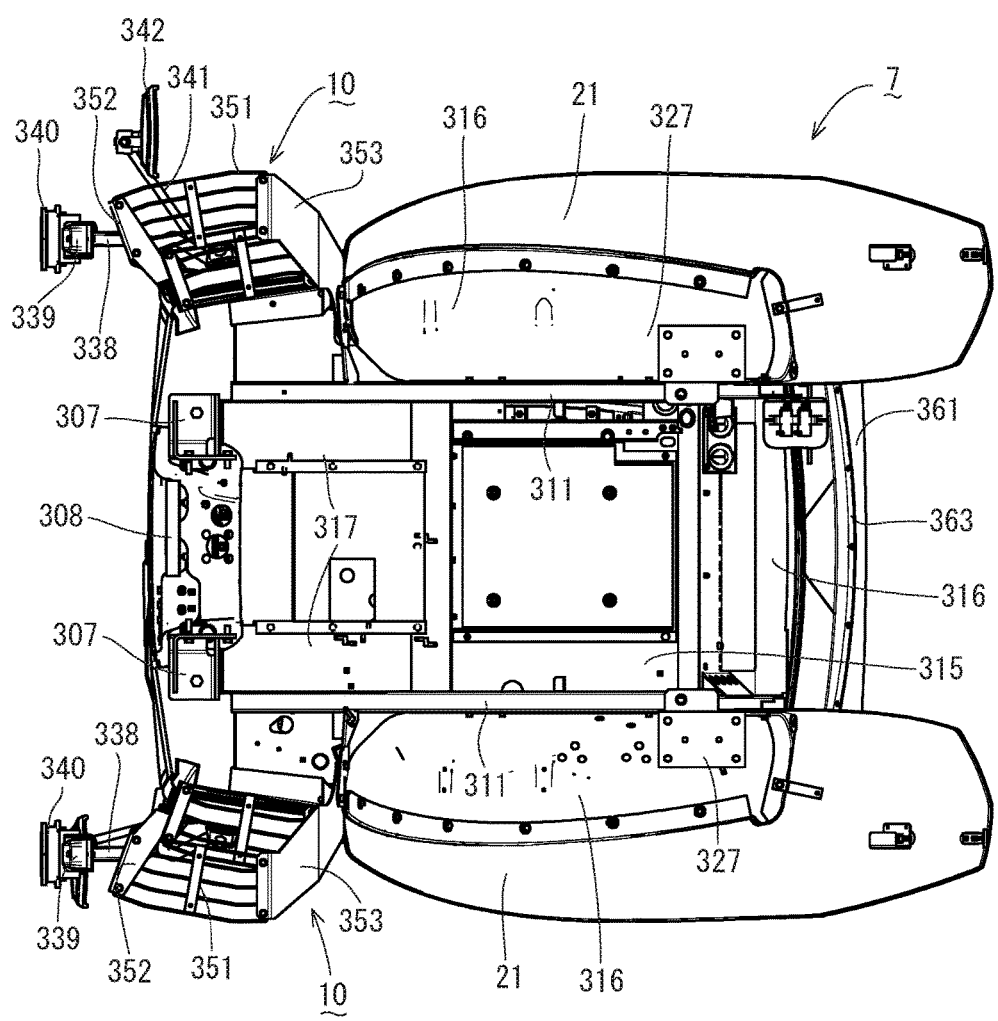
FIG. 16 is a bottom view of the cabin.
Figure 17:
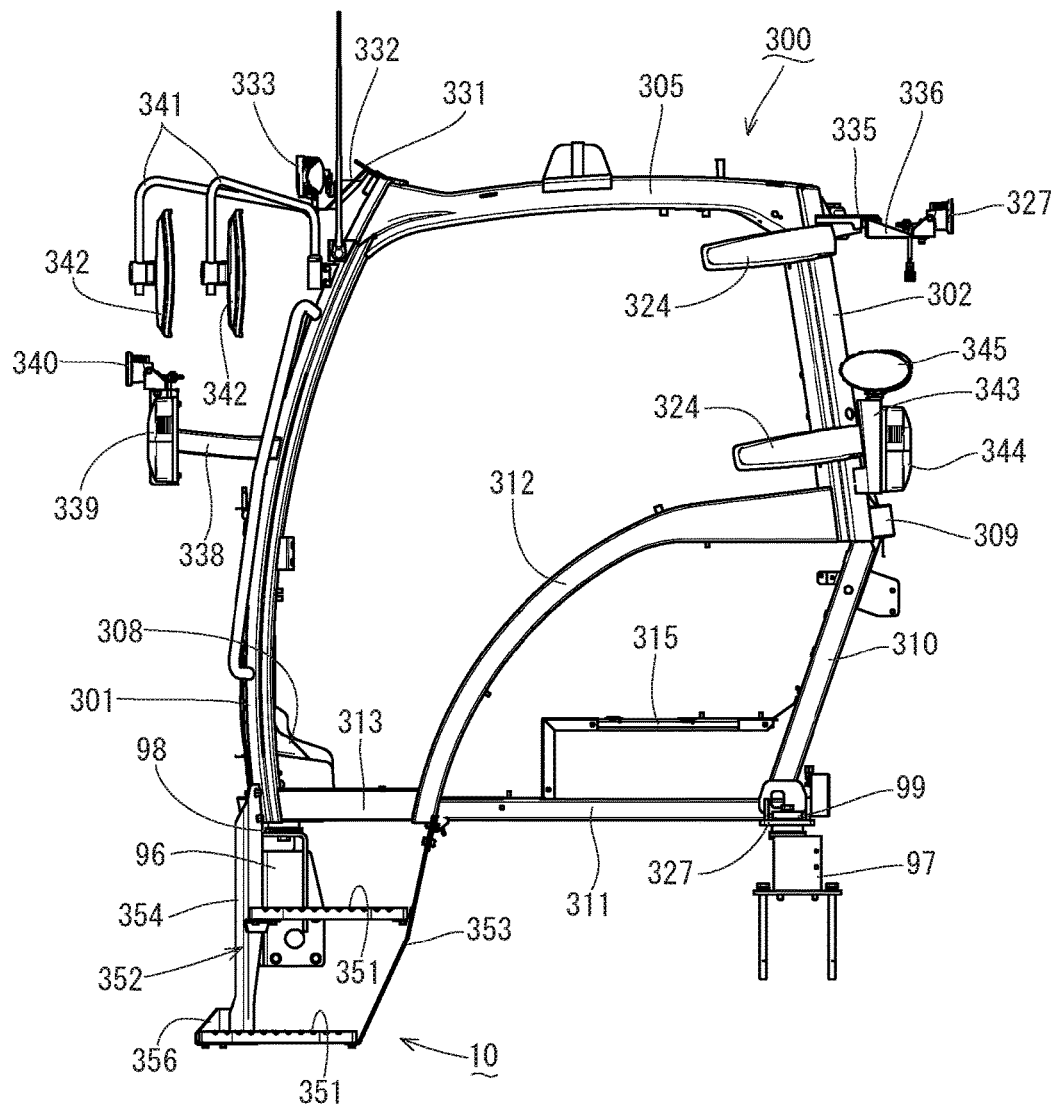
FIG. 17 is a left side view of a cabin frame.
Figure 18:
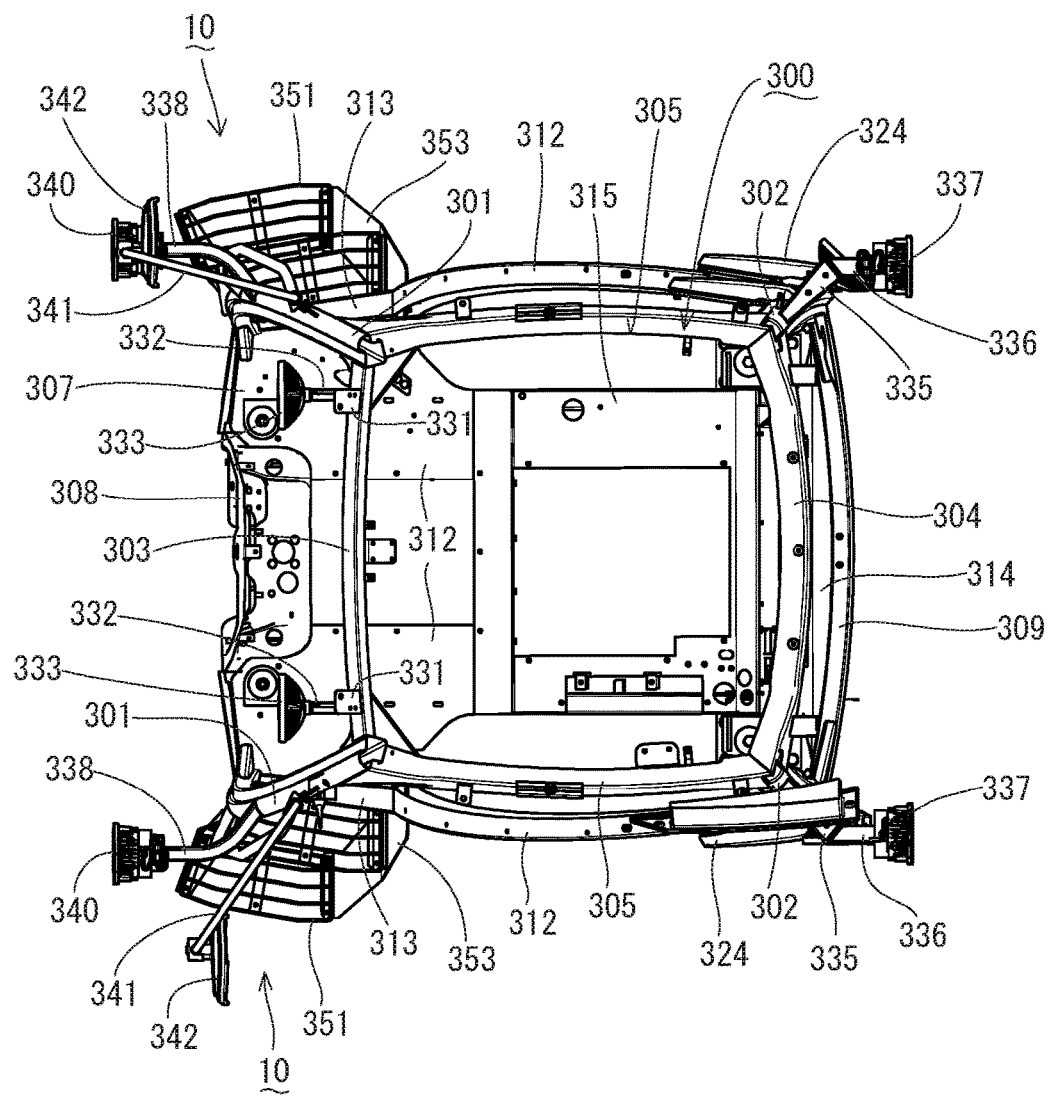
FIG. 18 is a plan view of the cabin frame.
Figure 19:
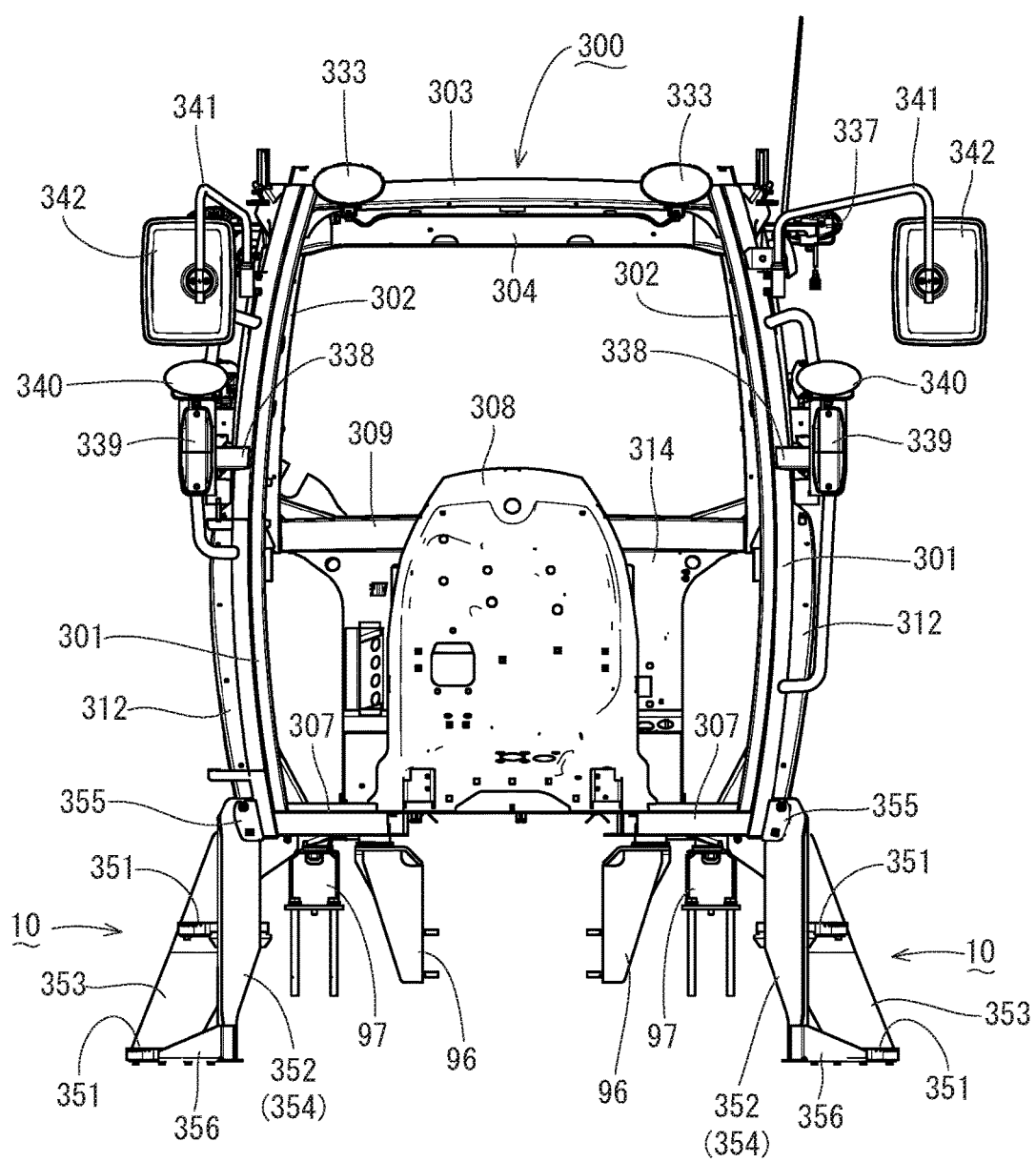
FIG. 19 is a front view of the cabin frame.
Figure 20:
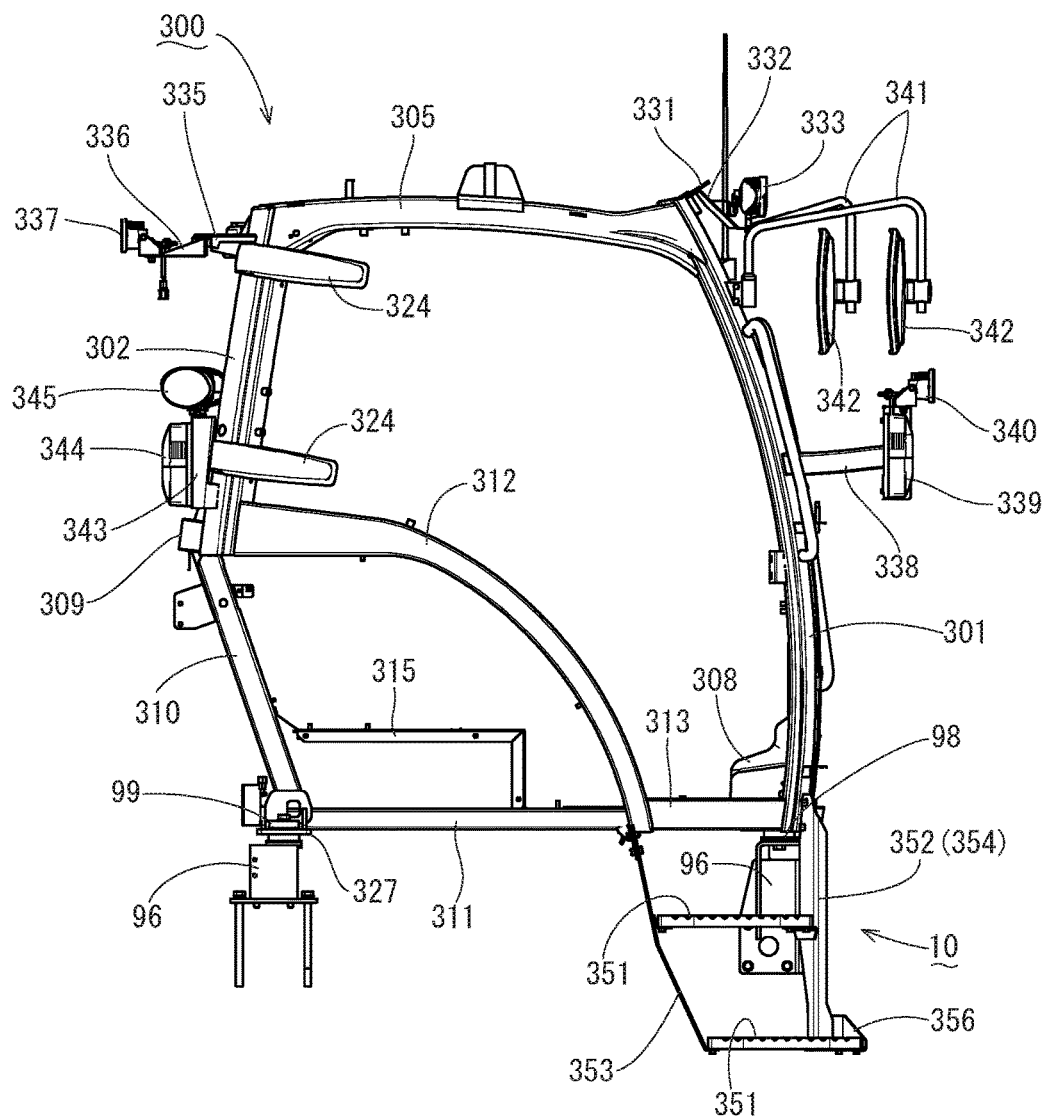
FIG. 20 is a right side view the cabin frame.
Figure 21:
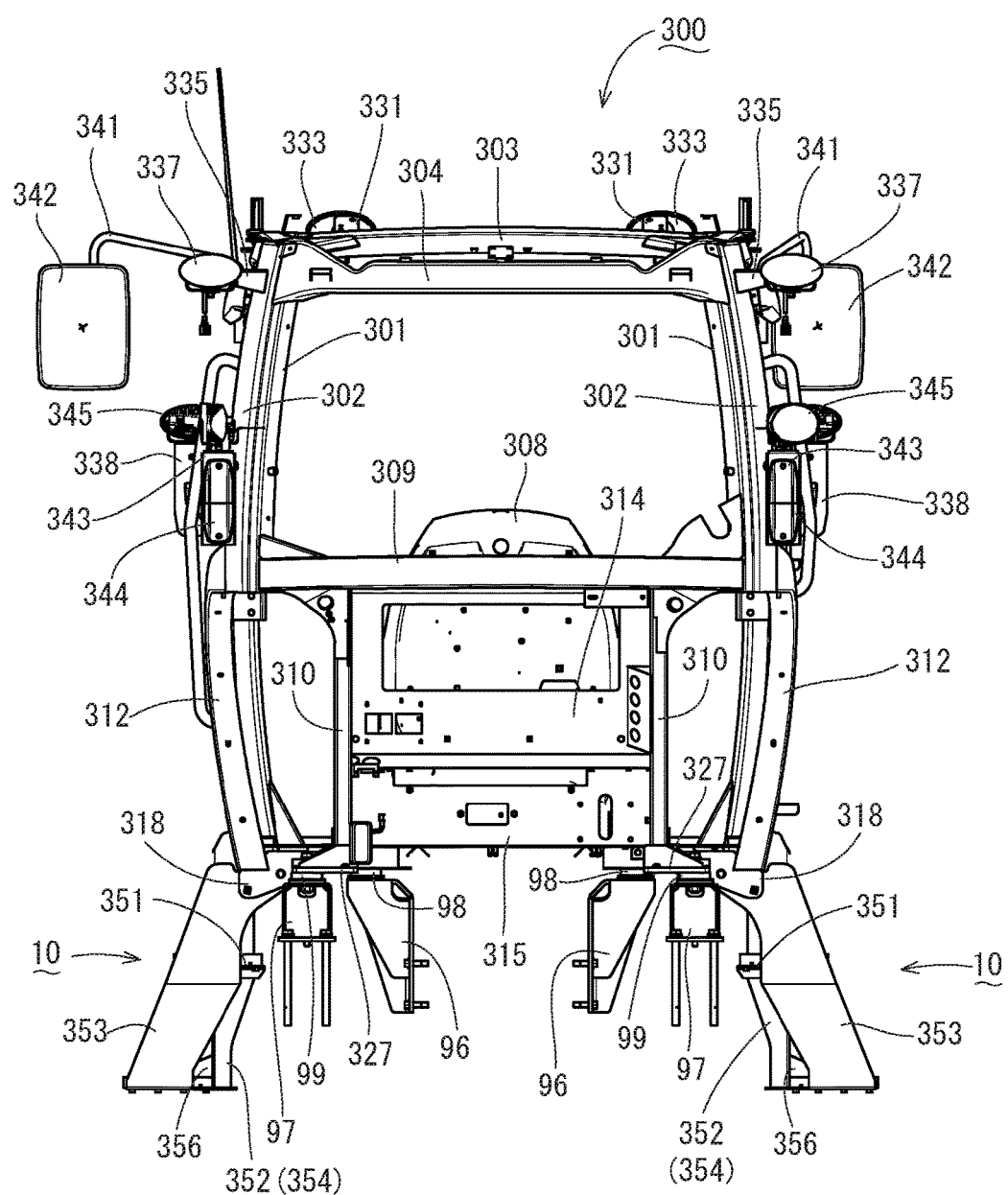
FIG. 21 is a rear view of the cabin frame.
Figure 22:
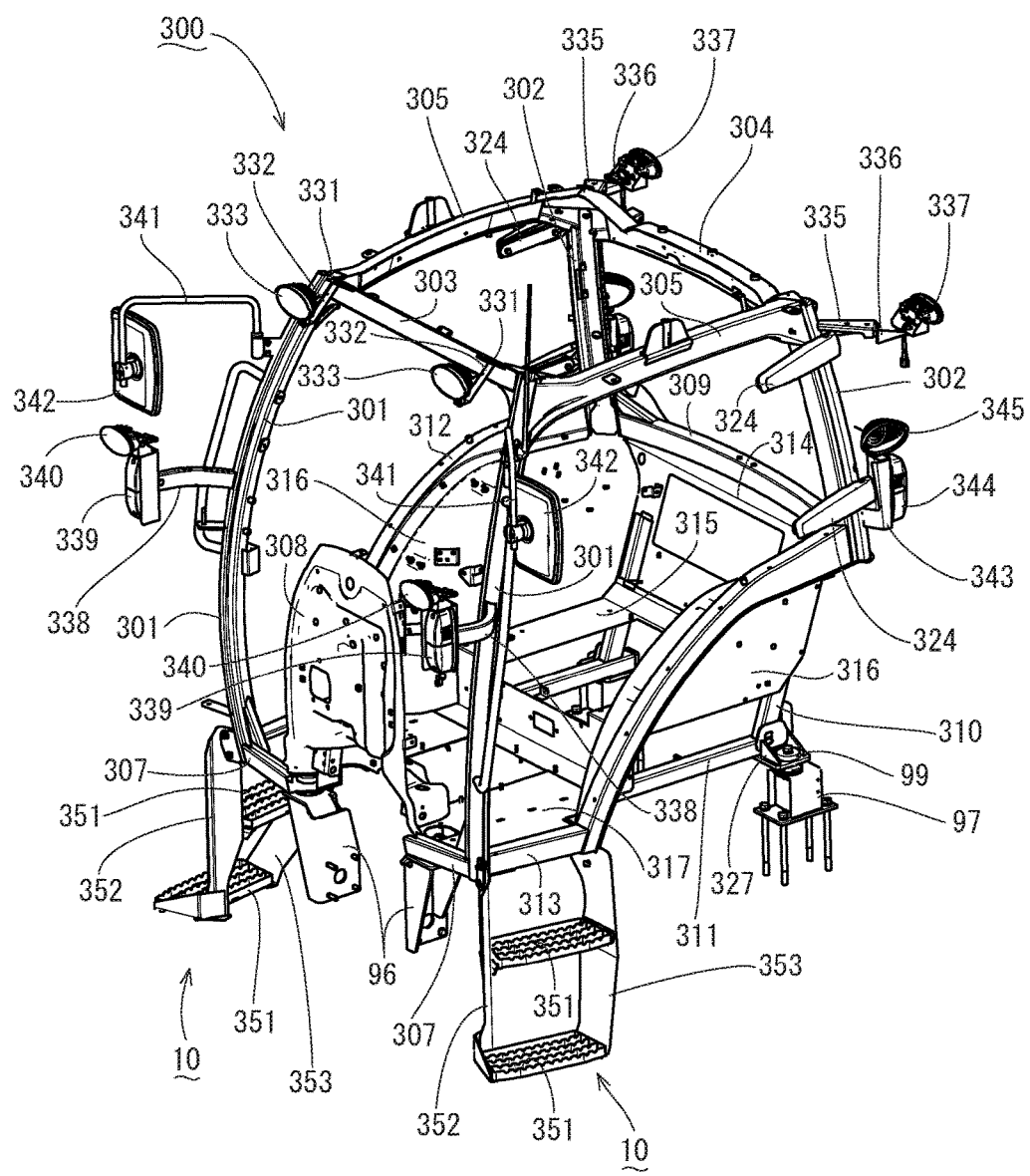
FIG. 22 is a perspective view of the cabin frame when obliquely viewed from a front and left side.
Figure 23:
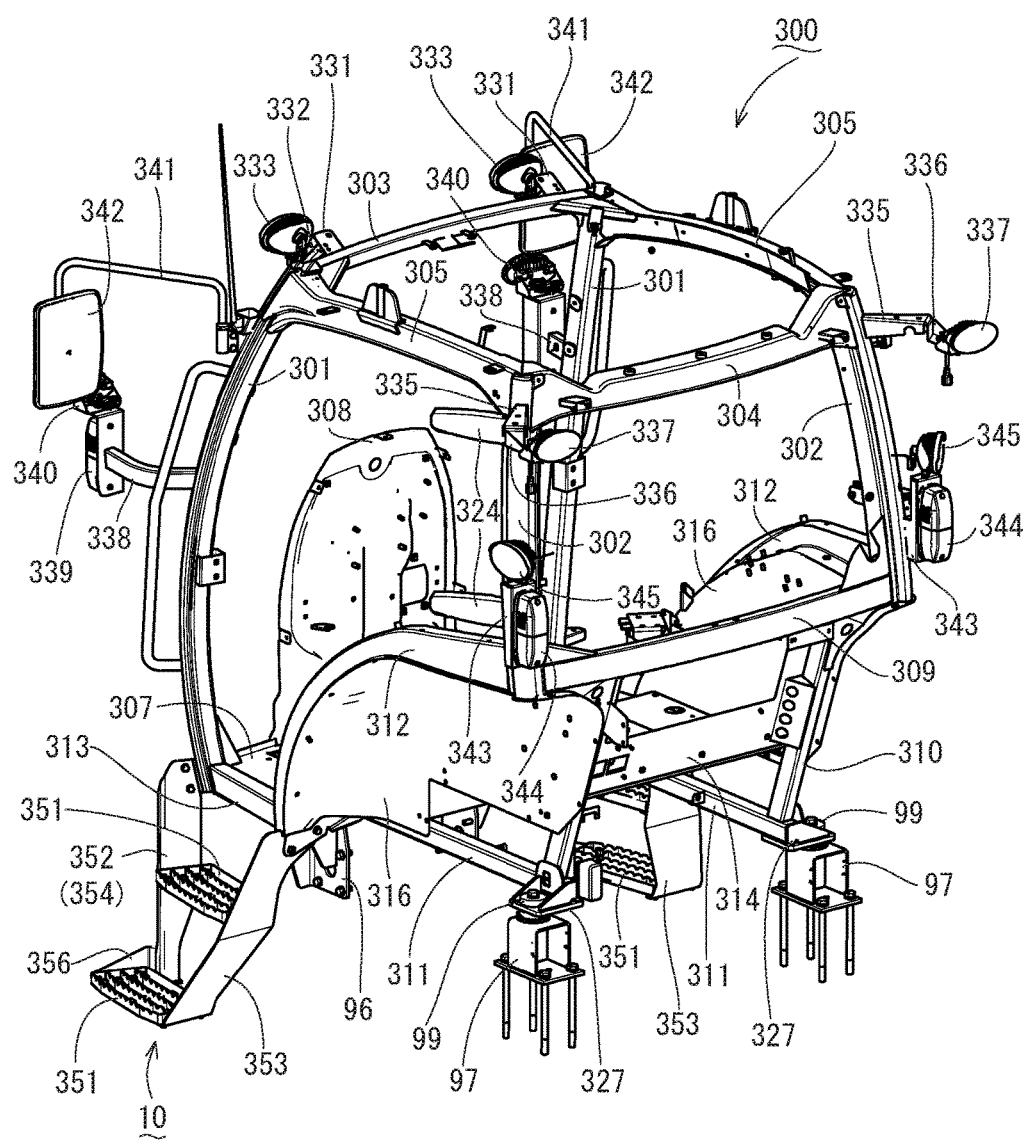
FIG. 23 is a perspective view of the cabin frame when obliquely viewed from a rear and left side.
Figure 24:
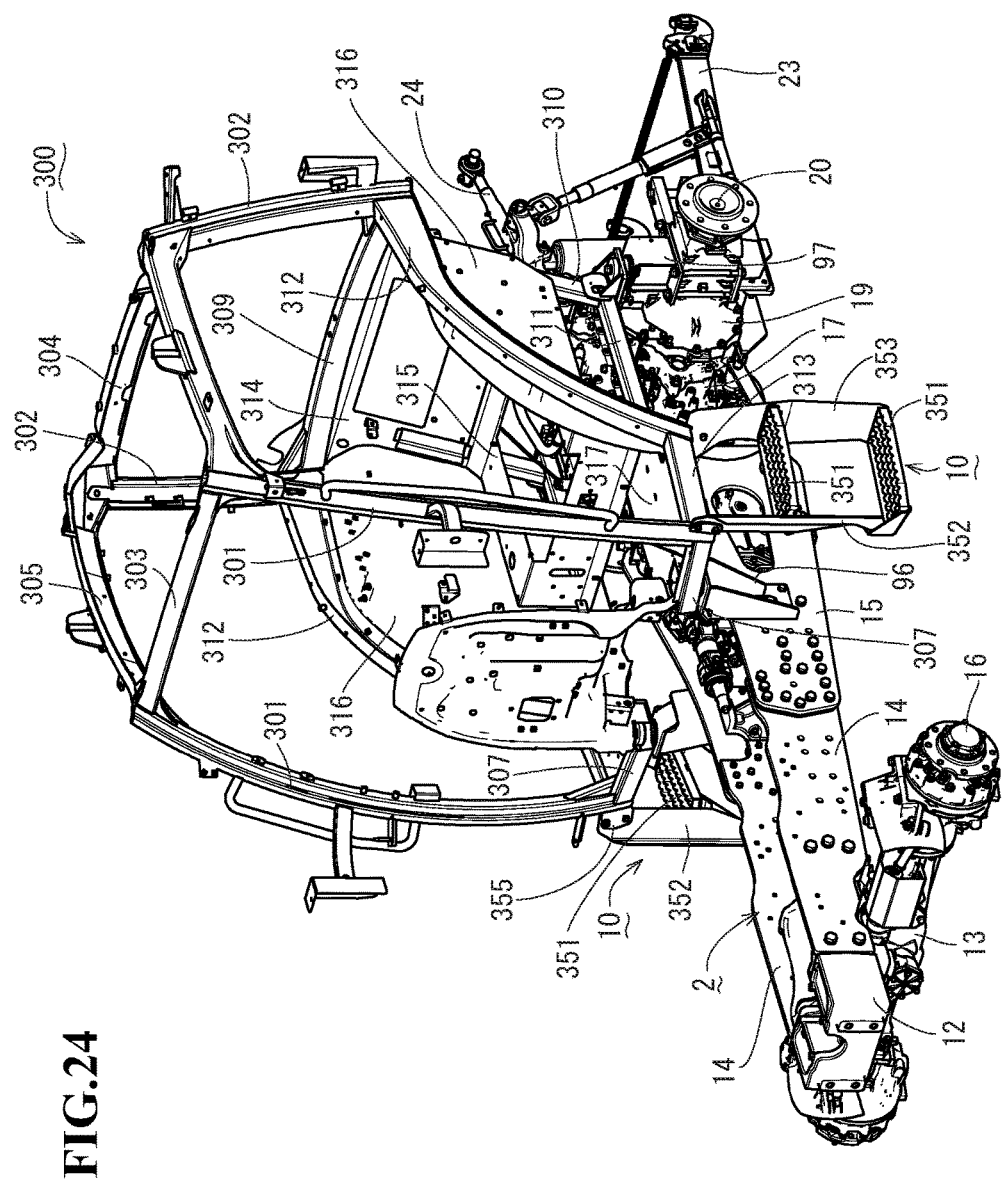
FIG. 24 is a perspective view of a vibration isolating support structure when obliquely viewed from a front and left side.
Figure 25:
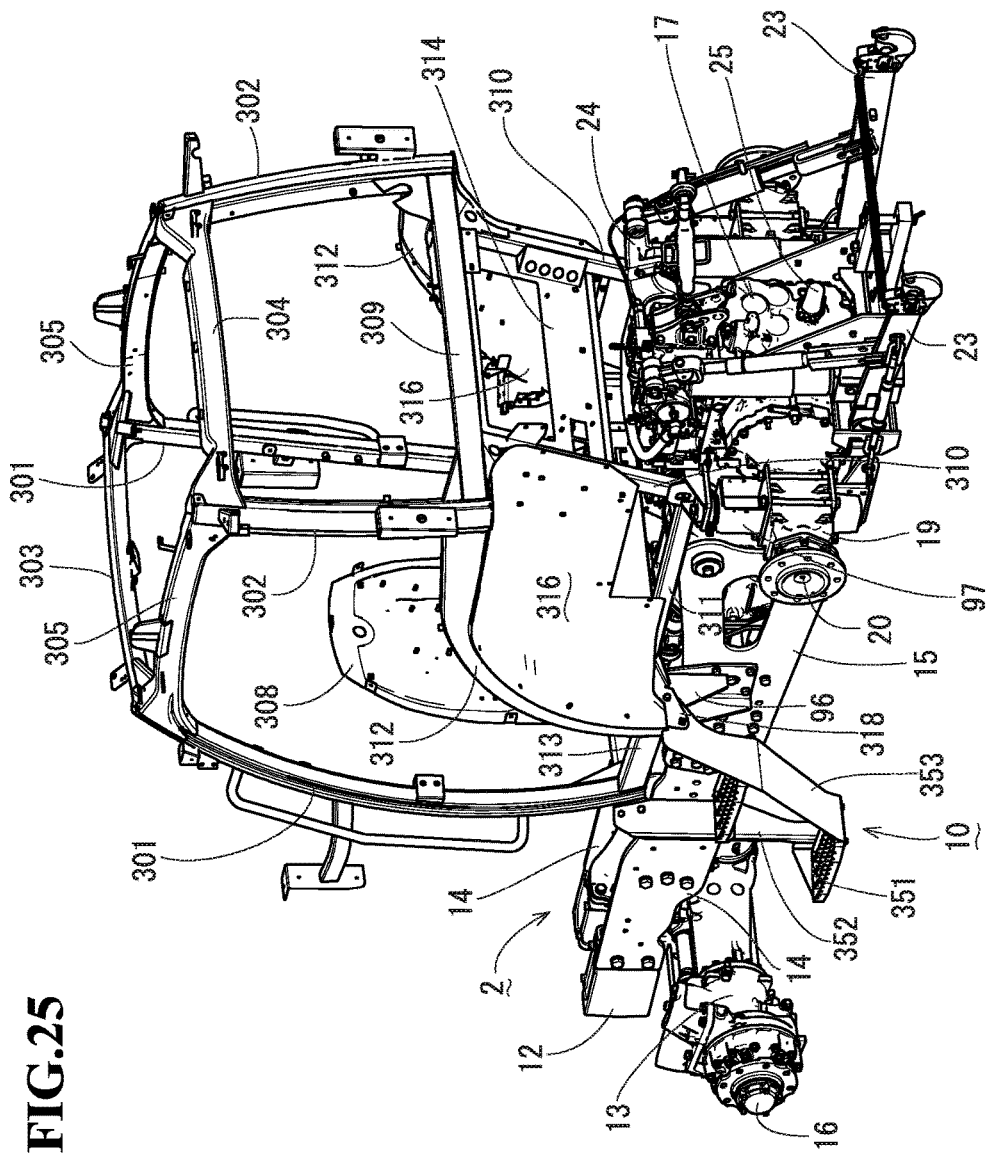
FIG. 25 is a perspective view of a vibration isolating support structure when obliquely viewed from a rear and right side.
Figure 26:
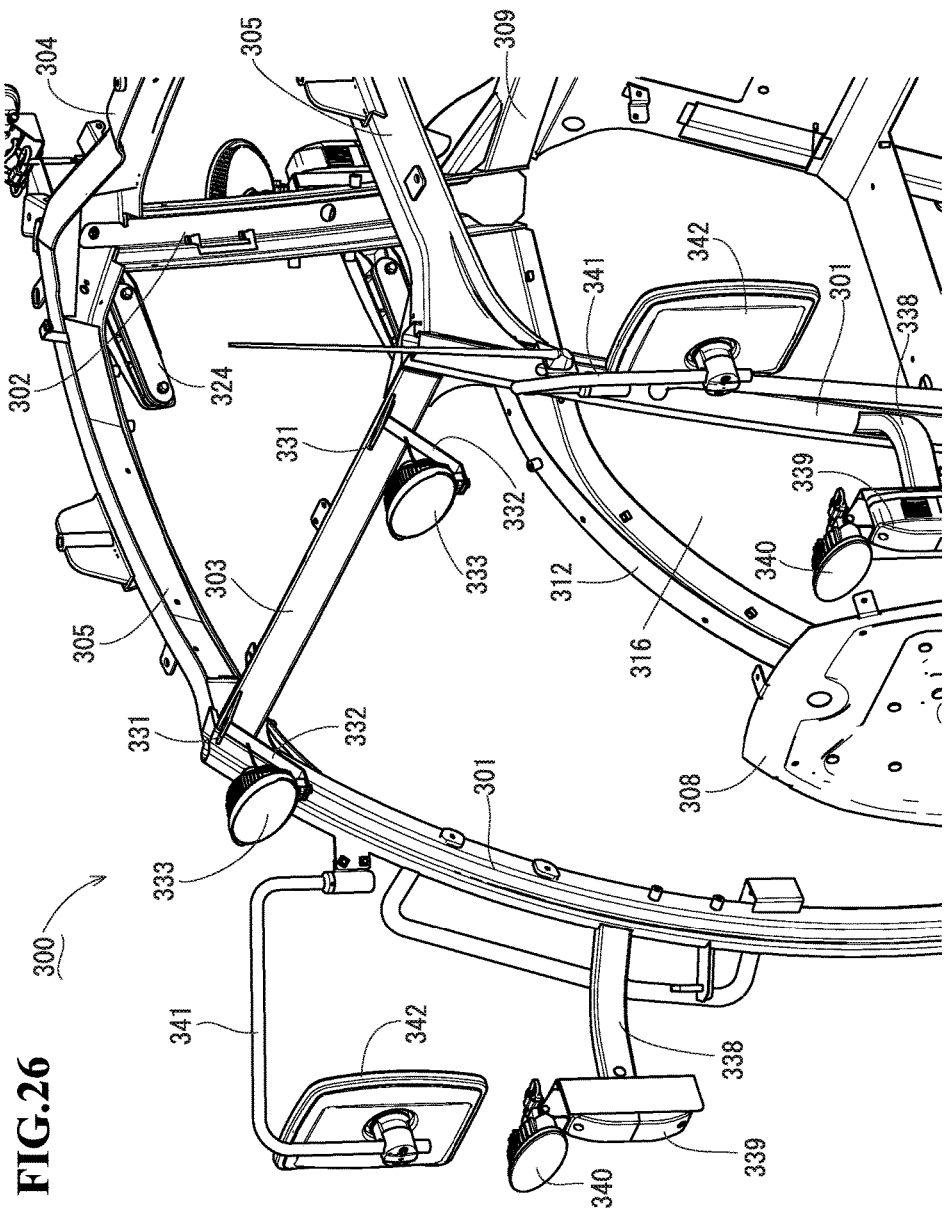
FIG. 26 is an enlarged perspective view of a right front support pillar and a front beam.
Figure 27:
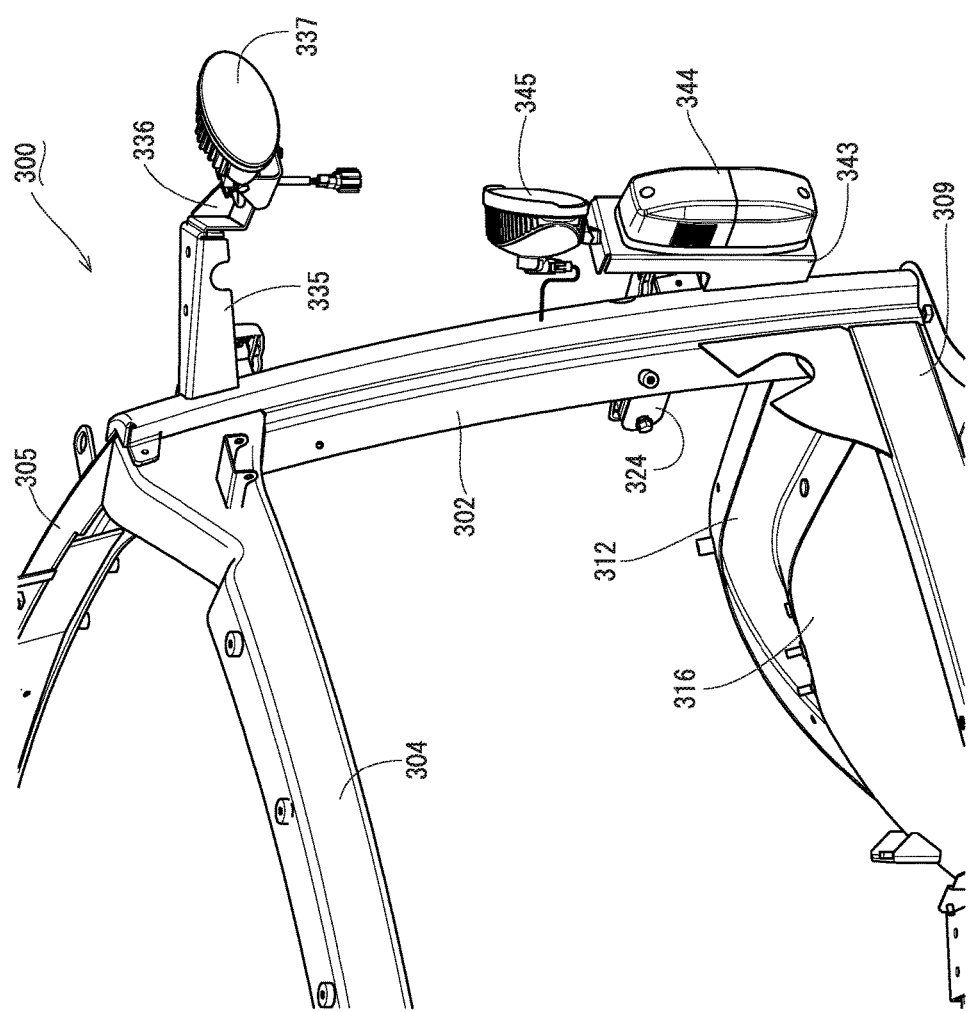
FIG. 27 is an enlarged perspective view of a right rear support pillar and a rear beam.
Figure 28:
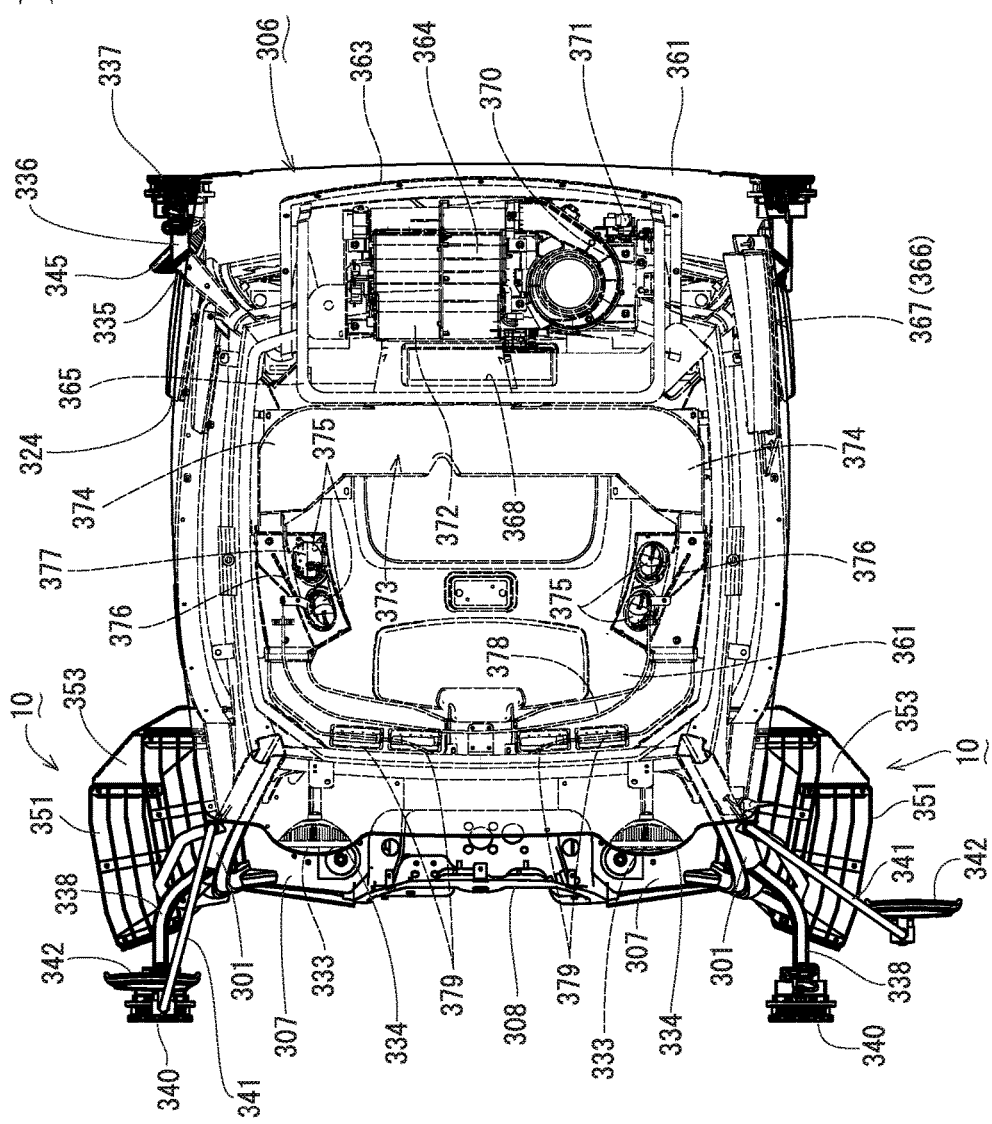
FIG. 28 is a plan view of a roof assembly.
Figure 29:
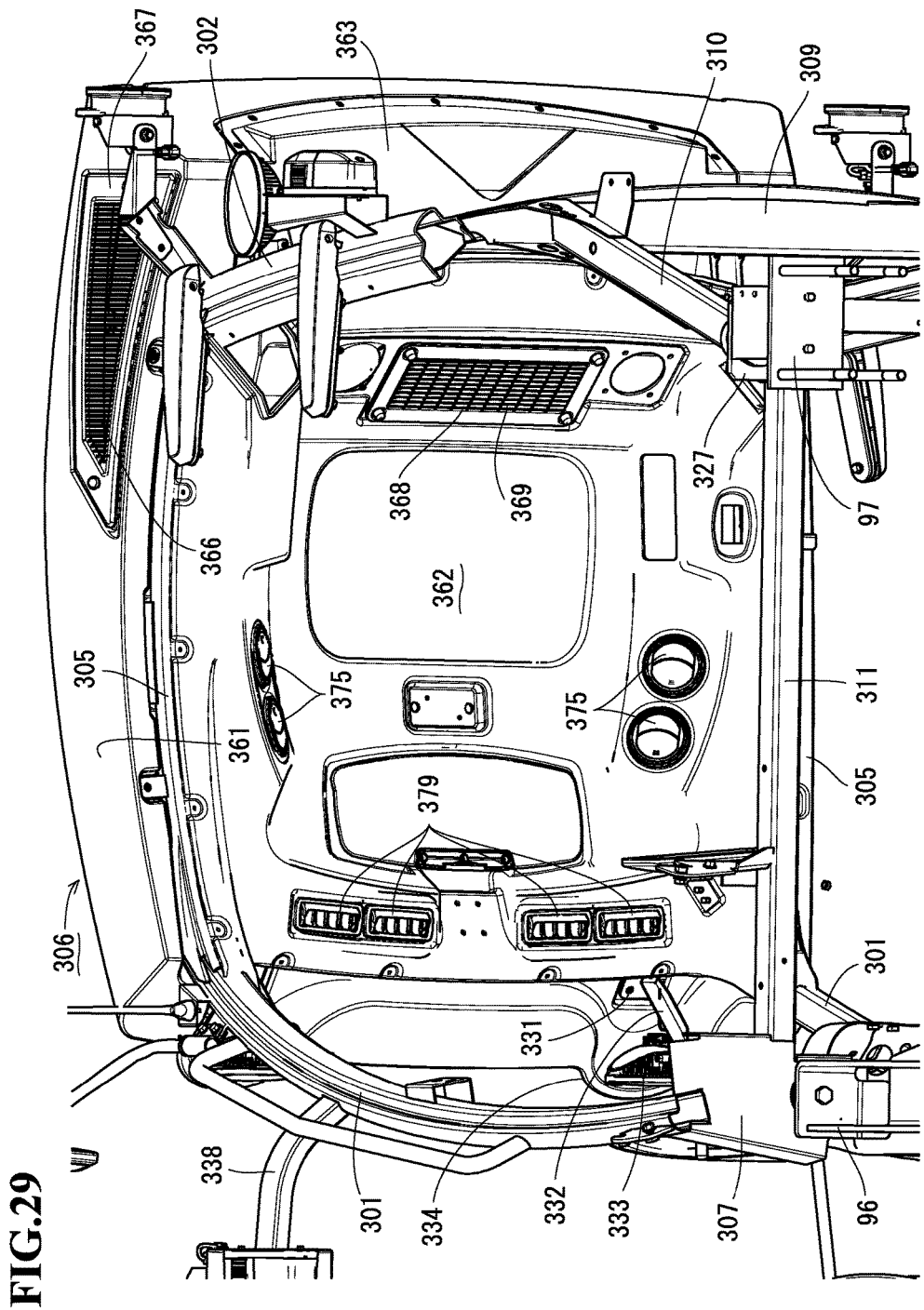
FIG. 29 is a perspective view of an inner roof.

Hereinafter, a tractor will be taken as an example of working vehicles, embodiments obtained by embodying the present invention, and will be described on the basis of the drawings.

First, the outline of a tractor 1 will be described with reference to FIGS. 1 to 10. In this embodiment, the tractor 1 includes a travelling machine body 2, and this travelling machine body 2 is supported by a pair of left and right front wheels 3 and a pair of left and right rear wheels 4. Each of the pair of front wheels 3 and the pair of rear wheels 4 serves as a travelling unit. The tractor 1 includes a diesel engine 5 (hereinafter referred to as just an engine), and this engine 5 is mounted on a front portion of the travelling machine body 2. The engine 5 is of a common rail type, and serves as a power source. The driving of the rear wheels 4 and the front wheels 3 by the engine 5 is configured to allow the tractor 1 to travel forward and backward. The engine 5 is covered by a bonnet 6. A cabin 7 is disposed on the upper face of the travelling machine body 2, and in the inside of the cabin 7, a steering seat 8 and a steering handle (a circular handle) 9 are disposed. The steering operation of this steering handle 9 allows the steering direction of the front wheels 3 to be directed to the left direction and the right direction. Flights of steps 10 are each disposed in a corresponding one of left and right side lower portions of the cabin 7, and these flights of steps 10 are used in operator's operation of getting on/off the cabin 7. A fuel tank 11 is disposed below the bottom of the cabin 7, and fuel is supplied from this fuel tank 11 to the engine 5.

The traveling machine vehicle 2 is constituted by an engine frame 14 and left and right machine body frames 15. The engine frame 14 includes a front bumper 12 and a front wheel-shaft case 13. The left and right machine body frames 15 are attachably/detachably secured to rear side portions of the engine frame 14. A front wheel shaft 16 is disposed so as to rotatably protrude outward from both of left and right end sides of the front wheel-shaft case 13. The front wheels 3 are each secured at a corresponding one of both of left and right sides of the front wheel case 13 via the front wheel shaft 16. A mission case 17 is coupled to a rear side portion of each of the machine body frames 15. This mission case 17 is configured to perform appropriate transmission shifting of the rotation power from the engine 5, and transfer the transmission-shifted power to the front and rear wheels 3, 3, 4, and 4. A tank frame 18 is bolt-secured at the lower face sides of the left and right machine body frames 15 and the mission case 17. The tank frame 18 has a rectangular frame plate shape in a bottom view, and jetties outward in both left and right directions. In this embodiment, the fuel tank 11 is separated into two portions, a left portion and a right portion. The left portion and the right portion of the fuel tank 11 are respectively separately mounted at the upper face side of the left jetty portion and the upper face side of the right jetty portion of the tank frame 18. A left-side wheel-shaft case 19 is mounted on the left outer side face of the mission case 17 so as to protrude outward from the left outer side face of the mission case 17; and a right-side wheel-shaft case 19 is mounted on the right outer side face of the mission case 17 so as to protrude outward from the right outer side face of the mission case 17. A left-side rear wheel shaft 20 is inserted inside the left-side rear wheel-shaft case 19 so as to be rotatable; and a right-side rear wheel shaft 20 is inserted inside the right-side rear wheel-shaft case 19 so as to be rotatable. The rear wheels 4 are each coupled to the mission case 17 via a corresponding one of the left and right rear wheel shafts 20. The upper side of the left wheel 4 is covered by a left-side rear fender 21; and the upper side of the right wheel 4 is covered by a right-side rear fender 21.

A hydraulic lifting and lowering mechanism 22 is attachably/detachably secured to the upper face of a rear portion of the mission case 17. The hydraulic lifting and lowering mechanism 22 is configured to allow a working machine, such as a rotary tiller, to be lifted and lowered. The working machine, such as a rotary tiller, is coupled to a rear portion of the mission case 17 via a three-point link mechanism including a pair of left and right lower links 23 and a top link 24. A PTO shaft 25 is disposed so as to protrude backward from the rear side face of the mission case 17. The PTO shaft 25 transfers a PTO driving force to the working machine, such as a rotary tiller.

An engine output shaft (omitted from illustration) is disposed so as to protrude backward from the rear side face of the engine 5, and a flywheel 26 is secured to the engine output shaft so as to be directly coupled to the engine output shaft. A main driving shaft 27 is coupled to a main transmission-shift input shaft 28 via a power transfer shaft 29 (see FIGS. 1, 7, and 10). The main driving shaft 27 is disposed so as to protrude backward from the flywheel 26. The main transmission-shift input shaft 28 is disposed so as to protrude forward from the front face side of the mission case 17. The power transfer shaft 29 includes universal joints at its both edges. The mission case 17 includes, inside itself, a continuously variable transmission device, a forward/backward travelling direction switching mechanism, a travelling sub transmission-shift gear mechanism, and a rear-wheel differential gear mechanism. The rotation power of the engine 5 is transferred to the main transmission-shift input shaft 28 of the mission case 17 via the main driving shaft 27 and the power transfer shaft 29, and then is subjected to appropriate transmission shifting by the continuously variable transmission device and the travelling sub transmission-shift gear mechanism. Further, the transmission-shifted power is transferred to the left and right rear wheels 4 via the rear-wheel differential gear mechanism.

A front-wheel output shaft 30 is disposed so as to protrude forward from a front lower portion of the mission case 17, and a front-wheel transfer shaft (omitted from illustration) protruding backward from the front wheel-shaft case 13 is coupled to the front-wheel output shaft 30 via a front-wheel driving shaft 31. The front wheel-shaft case 13 incorporates a front-wheel differential gear mechanism (omitted from illustration). The transmission-shifted power, resulting from the transmission shifting by the continuously variable transmission device and the travelling sub transmission-shift gear mechanism, which are disposed inside the mission case 17, is transferred from the front-wheel output shaft 30, the front-wheel driving shaft 31, and the front-wheel transfer shaft to the left and right front wheels 3 via the front-wheel differential gear mechanism, which is incorporated in the front wheel-shaft case 13.

Next, the structure of the inside of the cabin 7 will be described with reference to FIGS. 1 to 4. A steering column 32 is disposed at the front of the steering seat 8 in the inside of the cabin 7. A dashboard 33 is disposed at the front face side inside the cabin 7, and the steering column 32 is disposed so as to stand in a state of being buried in the rear face side of the dashboard 33. A steering handle 9 is attached to the upper end side of a handle shaft protruding upward from the upper face of the steering column 32. The steering handle 9 has an approximately circular shape in a plan view.

A single-touch lifting/lowering lever 34 and a pair of left and right brake pedals 35 are disposed at the right side of the steering column 32. The single-touch lifting/lowering lever 34 is used for operation of forcibly moving the working machine, such as a rotary tiller, to the highest lifted position or the lowest lowered position. The pair of left and right brake pedals 35 are used for operation of braking the traveling machine body 2. A forward/backward travelling direction switching lever (a reverser lever) 36 and a clutch pedal 37 are disposed at the left side of the steering column 32. The forward/backward travelling direction switching lever 36 is used for operation of switching the travelling direction of the travelling machine body 2 between a forward direction and a backward direction. The clutch pedal 37 is used for operation of disconnecting a clutch (omitted from illustration) for connecting/disconnecting the engine power.

An erroneous operation prevention member (a reverser guard) 38 is disposed at the left side of the steering column 32 and below the forward/backward travelling direction switching lever 36 so as to extend along the forward/backward travelling direction switching lever 36. The erroneous operation prevention member 30 serves as a contact prevention member, and is disposed below the forward/backward travelling direction switching lever 36 to prevent an operator who is getting on/off the tractor 1 from being in contact with the forward/backward travelling direction switching lever 36 without discretion. An operational display board 39 is disposed at the upper side on the rear face of the dashboard 33. The operational display board 39 incorporates a liquid crystal panel.

An accelerator pedal 41 is disposed at the right side of the steering column 32 on a floor plate 40. The floor plate 40 is located at the front side of the steering seat 8 inside the cabin 7. The accelerator pedal 41 is used for controlling the rotation speed of the engine 5 or the vehicle speed. In addition, approximately the whole of the upper face of the floor plate 40 is formed to be flat. Side-columns 42 are each disposed at a corresponding one of both of left and right sides interposing the steering seat 8. In a portion between the steering seat 8 and the left side-column 42, a parking brake lever 43, an extremely low speed lever (a creep lever) 44, a sub transmission-shift lever 45, and a PTO transmission-shift lever 46 are disposed. The parking brake lever 43 is used for operation of keeping the left and right rear wheels 4 in a braking state. The extremely low speed lever 44 is used for operation of forcibly reducing the travelling speed (vehicle speed) of the tractor 1 to a significant degree. The sub transmission-shift lever 45 is used for operation of switching the output range of the travelling sub transmission-shift gear mechanism inside the mission case 17. The PTO transmission-shift lever 46 is used for operation of switching the driving speed of the PTO shaft 25. A diff-lock pedal 47 is disposed below the steering seat 8. The diff-lock pedal is used for operation of turning on/off the differential driving of the both left and right rear wheels 4. A reverse PTO lever 48 is disposed at the rear left side of the steering seat 8. The reverse PTO lever 48 is used for operation of reversely driving the PTO shaft 25.

An arm rest 49 is disposed between the steering seat 8 and the left-side side-column 42. An operator sitting on the steering seat 8 uses this arm rest 40 to place and rest his or her arm. The arm rest 49 is configured separately from the steering seat 8 and includes a main transmission-shift lever 50 and a work-unit position dial 51 (a lifting/lowering dial). The main transmission-shift lever 50 is used for operation of increasing/reducing the traveling speed of the tractor 1. The work-unit position dial 51 is provided with a dial used for manually adjusting to change the height position of the working machine, such as a rotary tiller. In addition, the arm rest 49 is configured to be able to pivot about its lower rear end portion so as to be thrown up to a plurality of positions.

A throttle lever 52, a PTO clutch switch 53, and a plurality of hydraulic operation levers (SCV levers) 54 are disposed on the left-side column 42 in series from the front side. The throttle lever 52 is used for operation of setting and maintaining the rotation speed of the engine 5. The PTO clutch switch 53 is used for operating of connecting/disconnecting the power transfer from the PTO shaft 25 to the working machine, such as a rotary tiller. The plurality of hydraulic operation levers 54 are used for operation of switching pressurized-oil externally-drawing valves (sub control valves) (omitted from illustration) disposed at the upper face side of the mission case 17. Here, the pressurized-oil externally-drawing valves are for use in supplying operating oil to another working machine, such as a front loader, that is additionally attached to the tractor 1. In this embodiment, four hydraulic operation levers 54 are disposed so as to allow the number of the levers to correspond to the number of the pressurized-oil externally-drawing valves (which constitute a quadruple valve assembly in this embodiment).

Next, the details of the structure of the cabin 7 will be described with reference to FIGS. 11 to 27. The cabin 7, which covers the steering seat 8 disposed on the travelling machine body 2, includes a cabin frame 300. This cabin frame 300 constitutes a framework of the cabin 7 and has an approximately box frame shape. The cabin frame 300 includes a pair of left and right front support pillars 301, a pair of left and right rear support pillars 302, a front beam 303, a rear beam 304, and left and right side beams 305. The pair of left and right front support pillars 301 are located at the front side of the steering seat 8. The pair of left and right rear support pillars 302 are located at the rear side of the steering seat 8. The front beam 303 couples between the upper end portions of the left and right front support pillars 301. The front beam 304 couples between the upper end portions of the left and right rear support pillars 302. The left side beam 305 couples between the upper end portions of the left front support pillar 301 and the left rear support pillar 302, which are arranged in the front and rear direction. The right side beam 305 couples between the upper end portions of the right front support pillar 301 and the right rear support pillar 302, which are arranged in the front and rear direction. A roof assembly 306 is attachably/detachably secured to the upper end side of the cabin frame 300, that is, onto a rectangular-shaped frame constituted by the front beam 303, the rear beam 304, and the left and right side beams 305.

The lower end side of each of the front support pillars 301 is coupled to the left-right direction outer end side of a corresponding one of inwardly extending, left and right front lower-portion plates 307. The left-right direction inner end sides of both of the left and right front lower-portion plates 307 are coupled to a vertically long board support plate 308 so as to allow the board support plate 308 to stand upright between both of the left and right front support pillars 301. Meanwhile, the lower end sides of both of the left and right rear support pillars 302 are coupled to a rear intermediate beam 309. This rear intermediate beam 309 extends parallel to the rear beam 304. The rear intermediate beam 309 is coupled to the upper end sides of a pair of downwardly extending, left and right rear lower-portion frames 310. The lower end side of each of the rear lower-portion frames 310 and a corresponding one of the front lower-portion plates 307, these two kinds of members being arranged in the front and rear direction, are coupled to the long-length direction end portion of a corresponding one of forwardly and backwardly extending bottom frames 311.

The lower end side of each of the rear support pillars 302 is coupled to the upper rear end side of a corresponding one of fender frames 312. Each of the fender frames 312 is curved so as to expand forwardly and upwardly in a side view along the shape of a corresponding one of the rear fenders 211. The lower front end side of each of the fender frames 312 is coupled to the rear end side of a corresponding one of side frames 313. Each of the side frames 313 protrudes backward from a lower portion of a corresponding one of the front support pillars 301. Each of the side frames 313 is also coupled to the left-right direction outer side of a corresponding one of the front lower-portion plates 307. Each of the left and right rear fenders 21 is secured to the left-right direction outer face side of a corresponding one of the fender frames 312 and the left-right direction outer face side of one of the rear lower-portion frames 310 that is associated with the corresponding one of the fender frames 312.

A rear cover plate 314 is secured to the rear intermediate beam 309 and the left and right rear lower-portion frames 310, and covers a region surrounded by the rear intermediate beam 309 and the left and right rear lower-portion frames 310. A seat support plate 315 is secured to the lower end side of the rear cover plate 314 and the left and right bottom frames 311. The seat support plate 315 has an L-shape in a side view. The steering seat 8 is disposed on the seat support plate 315. Fender inner plates 316 are each secured to a corresponding one of the left and right fender frames 312, a corresponding one of the left and right rear lower-portion frames 310, and a corresponding one of the left and right bottom frames 311. Each of the fender inner plates 316 has an outwardly bulging shape along the front inner face side of the front wheel 4. The side columns 42 are each disposed on a corresponding one of the left and right fender inside plates 316. Floor support plates 317 are each secured to and supported by a corresponding one of the left and right front lower-portion plates 307, the front portion side of a corresponding one of the left and right bottom frames 311, a corresponding one of the left and right side frames 313, and the front end side of the seat support plate 315. The floor plate 40 is disposed on the left and right floor support plate 317. Ancillary frames 318 each couple the lower front end side of a corresponding one of the left and right fender frames 312 to a front-rear direction intermediate portion of a corresponding one of the bottom frames 311. Each of the ancillary frames 318 has a shape long in the left and right direction.

A front glass 321 is disposed at the front face side of the cabin frame 300, that is, in a region surrounded by the left and right front support pillars 301, the front beam 303, and the left and right front lower-portion plates 307. A rear glass 322 is disposed at the rear face side of the cabin frame 300, that is, in a region surrounded by the left and right rear support pillars 302, the rear beam 304, and the rear intermediate beam 309. Side doors 323 are each disposed at a corresponding one of the left and right side face sides of the cabin frame 300, that is, in a region surrounded by the front and rear support pillars, which are arranged in the front and rear direction, the side beam, the fender frame, and the side frame. Each of the side doors 323 is constituted by transparent glass, and is openably/closably secured to a corresponding one of the rear support pillars 302 via a pair of upper and lower hinges 324.

As shown in FIGS. 24 to 27, the front side of each of the left and right front lower-portion plates 307 is coupled to a corresponding one of front-portion support tables 96. Each of the support tables 96 is secured to a corresponding one of the left and right machine body frames 15 via a front rubber vibration isolator 98, serving as a vibration isolation member. Base brackets 327 are each disclosed in a coupling portion at which a corresponding one of the left and right rear lower-portion frames 310 and a corresponding one of the bottom frames 311 are coupled to each other. Each of the base brackets 327 jetties outward in the left and right direction. Each of the left and right base brackets 327 is coupled to a corresponding one of rear-portion support tables 97 via a rear rubber vibration isolator 99, serving as a vibration isolation member. Each of the rear-portion support tables 97 is secured onto a corresponding one of the left and right rear wheel-shaft cases 19. Accordingly, the travelling machine body 2 supports the cabin 7 in a vibration isolation manner via the plurality of rubber vibration isolators 98 and 99.

As shown in FIGS. 11 to 27, various support stays 331, 335, 338, and 343, to which light fitments are attached, are disposed on the cabin frame 300. That is, a pair of left and right front upper-side support stays 331 are each welded and secured to a corresponding one of long-length direction intermediate portions of the front beam 303. Each of the front upper-side support stays 331 is a thin-plate shaped stay protruding forward and obliquely upward. Front upper-side working lights 333, each being an example of the light fitments, are each secured to a corresponding one of the front upper-side support stays 331 via a corresponding one of front attachment pieces 332, each extending forwardly and downwardly. Each of the front upper-side working lights 333 is a working light for illuminating the front side of the tractor 1. The front upper-side working lights 333 are located so as to overlap the front beam 303 in a front view not to interfere with front visibility from an operator. Each of concave portions 334 is formed at the front side of the roof assembly 606 so as to allow a corresponding one of the front upper-side working lights 333 to be set in the each of concave portions 334. Each of the concave portions 334 is an upwardly concaved portion, and can be also referred to as an outwardly bulging portion. When the roof assembly 306 is assembled to the upper end side of the cabin frame 300, each of the front upper-side working lights 333 is set in a corresponding one of the concave portions 334, disposed at the front side, and as a result, the roof assembly 306 and each of the front upper-side working lights 333 do not interfere with each other.

Meanwhile, the base end side of each of rear upper-side support stays 335 is welded and secured to the upper end side of a corresponding one of the left and right rear support pillars 302 so as not to interfere with rear visibility from an operator. That is, each of the rear upper-side support stays 335 is disposed so as to protrude, in a plan view, in a direction inclined outward in the left and right direction from a backward direction and extending so as to be gradually apart from both of the rear beam 304 and a corresponding one of the left and right side beams 305. Rear upper-side working lights 337, each being an example of the light fitments, are each attached to the edge side of a corresponding one of the rear upper-side support stays 335 via a corresponding one of backwardly extending rear attachment pieces 336. The left and right rear upper-side working lights 337 are lights for illuminating the rear side of the tractor 1 (i.e., lights for illuminating a working machine and any other viewing object at rear side of the tractor 1). In this embodiment, the rear upper-side support stays 335 are disposed, not on the rear beam 304, but on the upper end sides of the respective rear support pillars 302 to not only favorably ensure rear visibility from an operator, but also ensure a disposition space at the rear side of the roof assembly 306 between the left and right rear upper-side support stays 335. This secured disposition space is a disposition space for a rear cover 363, in which an air conditioner 364 is contained.

The base end side of each of front intermediate-side support stays 338 is welded and secured to an upper-lower direction intermediate portion of a corresponding one of the left and right front support pillars 301. A front composite light 339 and a front intermediate-side working light 340, which are examples of the light fitments, are attached to the edge side of each of the front intermediate-side support stays 338. In order not to allow the front composite lights 339 and the front intermediate-side working lights 340 to interfere with front visibility from an operator, each of the front intermediate-side support stays 338 is disposed so as to protrude, in a plan view, in a direction inclined outward in the left and right direction from a forward direction and extending so as to be gradually apart from both of the front beam 303 and a corresponding one of the left and right side beams 305, and then, bend so as to extend forward from a long-length intermediate portion. Each of the front composite lights 339 is a light for indicating operator's intentions in operation of the tractor 1, such as a vehicle width and turning to the left or right direction, to vehicles and/or persons positioned at the front side of the tractor 1. In this embodiment, the front composite light 339 is constituted by a directional light and a clearance light. The left and right front intermediate-side working lights 340 are lights for illuminating the front side of the tractor 1. In this embodiment, a vertically-long shaped attachment bracket 341 is disposed at the edge side of each of the front intermediate-side support stays 338, and the front composite light 339 is attached to the front face side of the attachment bracket 341. The front intermediate-side working lamp 340 is attached to the upper end side of the attachment bracket 341. Each of side mirrors 342 are secured to a portion above the front intermediate-side support stay in a corresponding one of the left and right front support pillars 301 via a corresponding one of mirror stays 341. Each of the mirror stays 341 also extends, in a plan view, in a direction inclined outward in the left and right direction from the forward direction so as to be gradually part from both of the front beam 303 and a corresponding one of the left and right side beams 305 so as not to interfere with front visibility from an operator.

The front face side of each of vertically long, rear lower-side support stays 343 is welded and secured to a lower portion of a corresponding one of the left and right rear support pillars 302. A rear composite light 344 and a rear lower-side working light 345, which are examples of the light fitments, are attached to the rear face side of each of the rear lower-side stays 343. Each of the rear lower-side support stays 343 jetties, in a back view, outward in the left and right direction from a corresponding one of the left and right rear support pillars 302 so as not to allow the rear composite lights 344 and the rear lower-side working lights 345 to interfere with front visibility from an operator. Each of the rear composite lights 344 is a light for indicating operator's intentions in operation of the tractor 1, such as slowing down, halt, a backward motion, and/or turning to the left or right direction, to vehicles and/or persons positioned in the rear side of the tractor 1. Each of the rear composite lights 344 is constituted by a taillight, a brake light, a reversing light, and a directional light. The left rear lower-side working light 345 is a light for illuminating the left side of the tractor 1; and the right rear lower-side working light 345 is a light for illuminating the right side of the tractor 1. In this embodiment, the rear composite light 344 is attached to the front face side of each of the rear lower-side support stays 343. The rear lower-side working light 345 is attached to the upper end side of each of the rear lower-side support stays 343. The front composite lights 339 and the rear composite lights are set to positions having approximately the same height in the upper and lower direction.

In addition, in this embodiment, although the details are not illustrated, the inside of the cabin frame 300 is formed to be hollow, and the hollow inside is configured to serve as wiring paths for use in inserting and passing cables. Further, the cables are drawn from notches (omitted from illustration) formed on the support pillars 301 and 302, the beams 303 and 304, and the support stays, and the relevant cables are coupled to the light fitments 333, 337, 339, 340, 344, and 345.

As clearly understood from the above description and FIGS. 11 to 27, in the working vehicle 1 including the cabin 7, which covers the steering seat 8 disposed on the vehicle machine body 2 and which includes the cabin frame 300 constituting a framework of the cabin 7, and the roof assembly 306 disposed at the upper end side of the cabin frame 300, the support stays 331, 335, 338, and 343, to which the light fitments 333, 337, 339, 340, 344, and 345 are attached, are disposed on the cabin frame 300, and thus, this configuration enables the light fitments 333, 337, 339, 340, 344, and 345 to be directly attached to the cabin frame 300. This configuration, therefore, contributes to improvement of the ease of assembling work in a production line, and thus, enables a cost reduction.

Further, the cabin frame 300 includes the pair of left and right front support pillars 301, the pair of left and right rear support pillars 302, the front beam 303, which couples between the upper end portions of the front support pillars 301, the rear beam 304, which couples between the upper end portions of the rear support pillars 302, the side beams 305, one of which couples between the upper end portions of the left front support pillar 301 and the left rear support pillar 302, these two support pillars being arranged in the front and rear direction, the other one of which couples between the upper end portions of the right front support pillar 301 and the right rear support pillar 302, these two support pillars being arranged in the front and rear direction. Moreover, the front composite light 339 and the front intermediate-side working light 340, which serve as light fitments among the light fitments, are attached to each of the support stays 338, which is disposed in an upper-lower direction intermediate portion of a corresponding one of the front support pillars 301, and the rear composite light 344 and the rear intermediate-side working light 345, which serve as light fitments among the light fitments, are attached to each of the support stays 343, which is disposed in a lower portion of a corresponding one of the rear support pillars 302. Accordingly, this configuration enables the front composite light 339 and the front intermediate-side working light 340 to be integrally attached to each of the support stays 338, which is disposed on a corresponding one of the front support pillars 301, and enables the rear composite light 344 and the rear lower-side working light 345 to be integrally attached to each of the support stays 343, which is disposed on a corresponding one of the rear support pillars 302. That is, this configuration enables the support stays 338 and 343 to be used as common support stays for the plurality of light fitments 339, 340, 344, and 345, and thus contributes to reduction of the number of components. Further, this configuration makes it simple to rout cables for the plurality of light fitments 339, 340, 344, and 345. Moreover, this configuration facilitates ensuring visibility in front, rear, left, and right directions from the inside of the cabin 7.

As clearly understood from the above description and FIGS. 11 to 27, in the working vehicle 1 including the cabin 7, which covers the steering seat 8 disposed on the vehicle machine body 2 and which includes the cabin frame 300 constituting a framework of the cabin 7, and the roof assembly 306 disposed at the upper end side of the cabin frame 300, the cabin frame 300 includes the pair of left and right front support pillars 301, the pair of left and right rear support pillars 302, the front beam 303, which couples between the upper end portions of the front support pillars 301, the rear beam 304, which couples between the upper end portions of the rear support pillars 302, the side beams 305, one of which couples between the upper end portions of the left front support pillar 301 and the left rear support pillar 302, these two support pillars being arranged in the front and rear direction, the other one of which couples between the upper end portions of the right front support pillar 301 and the right rear support pillar 302, these two support pillars being arranged in the front and rear direction. Further, the front upper-side working lights 333 are each attached to a corresponding one of the pair of left and right front upper-side support stays 331, which are disposed in long-length direction intermediate portions of the front beam 303, and the rear upper-side working lights 337 are each attached to a corresponding one of the support stay 335, each disposed at the upper side of a corresponding one of the rear support pillars 302. Thus, this configuration enables the front upper-side working lights 333 to be directly attached to the front beam 303, and enables the rear upper-side working lights 337 to be directly attached to a corresponding one of the rear support pillars 302. This configuration, therefore, contributes to improvement of the ease of assembling work in a production line, and thus, enables a cost reduction. Additionally, this configuration makes unnecessary to attach the front upper-side working lights 333 and 337 to the roof assembly 306, and to route the cables, and thus, makes it simple to assemble the roof assembly 306 to the cabin frame 300. In this respect, similarly, this configuration contributes to improvement of the ease of assembling work in the production line.

Further, the individual front upper-side working lights 333 are located so as to overlap the front beam 303 in a front view, and thus, this configuration significantly reduces the possibility that the individual front upper-side working lights 333 block front visibility from an operator sitting on the steering seat 8, and as a result, favorably ensures the front visibility from the operator.

Next, the details of the structure of a flight of steps 10, which is disposed at each of the left and left lower portions of the cabin 7, will be described with reference to FIGS. 11 to 23. As shown in FIGS. 11 to 23, flights of steps 10, for use in operator's operation of getting on/off the cabin 7, are each disposed so as be suspended at a corresponding one of left and right lower portions included in the cabin 7 and located between the pair of front wheels 3 and the pair of rear wheels 4, these two pairs of wheels being arranged in the front and rear direction. In this embodiment, each of the flights of steps 10 includes a plurality of tread steps 351 (two tread steps 351 in this embodiment), a front-side side plate 352, and a rear-side side plate 353. These front-side side plate 352 and rear-side side plate 353 are coupled to each of the plurality of tread steps 351. The front-rear direction positions of the plurality of tread steps 351 are displaced to positions different from one another such that the lower tread step a tread step 351 selected from among the tread steps 351 is, the more apart from the rear wheel 4 the front-rear direction position of the selected tread step 351 is. In this embodiment, a lower tread step 351 is located at a position displaced more forward than the displaced position of an upper tread step 351.

In this case, the front-side side plate 352 is formed in an approximately L-shape in a front view. The upper end side of a vertically long portion 354 of the front-side side plate 352 is bolt-secured to a bracket piece 355. This bracket piece 355 is welded and secured to the lower end side of the front support pillar 301. The front end side of the upper tread step 351 is secured to an upper-lower direction intermediate portion of the vertically long portion 354 of the front-side side plate 352. The front end side of the lower tread step 351 is secured to a lower end horizontal portion 356 of the front-side side plate 352. This lower end horizontal portion 356 of the front-side side plate 352 protrudes forward from the vertically long portion.

The upper end side of the rear-side side plate 353 is bolt-secured to one of the ancillary frames 318, each of which couples the bottom frame 311 to a corresponding one of the left and right fender frames 312. The rear end side of the upper tread step 351 is secured to an upper-lower direction intermediate portion of the rear-side side plate 353. The rear end side of the lower tread step 351 is secured to the lower end side of the rear-side side plate 353. The rear-side side plate 353 is inclined forward and obliquely downward, and further bends forward approximately at an upper-lower direction intermediate portion. This configuration facilitates directing the movement of an operator who is getting on the cabin 7 to a backward and obliquely upward direction toward the steering seat 8 (that is, the configuration, which allows the front-rear direction positions of the tread steps 351 to be displaced to positions different from one another, enables the trajectory of movement of an operator to be guided toward the steering seat 8). Accordingly, this configuration significantly improves the ease of operator's operation of getting on/off the cabin 7.

As shown in FIGS. 13, 19, 22, and 23, the left-right direction width of the rear-side side plate 353 is set so as to be larger than the left-right direction width of the front-side side plate 352 (the vertically long portion 354). With this configuration, an operator is not obstructed by the existence of the front-side side plate 352 (the vertically long portion 354) when placing his or her foot on each of the tread steps 351, and in this respect, similarly, this configuration contributes to improvement of the ease of operator's operation of getting on/off the cabin 7. Further, since each of the rear-side side plates 353 has a large width, the influence of mud flashing by the rear wheels 4 is effectively reduced by the existence of the rear-side side plates 353.

As clearly understood from the above description, and FIGS. 11 to 23, in the working vehicle 1 including the travelling machine body 2, which mounts the engine 5, the pair of left and right front wheels 3 and the pair of left and right rear wheels 4, which support the travelling machine body 2, the cabin 7, which covers the steering seat 8 disposed on the travelling machine body 2, and the flights of steps 10, for use in operator's operation of getting on/off the cabin 7, the flights of steps 10 are each structured so as to be suspended at a corresponding one of left and right lower portions between the pair of front wheels 3 and the pair of rear wheels 4, which are arranged in the front and rear direction. Further, each of the flights of steps 10 includes the plurality of tread steps 351 and the side plates 352 and 353, which are arranged in the front and rear direction, and the front-rear direction positions of the plurality of tread steps 351 are displaced to positions different from one another such that the lower tread step a tread step 351 selected from among the tread steps 351 is, the more apart from the rear wheel 4 the front-rear direction position of the selected tread step 351 is. This configuration, therefore, allows the tread steps 351 to be positioned along the trajectory of movement of an operator toward the cabin 7, and thus, significantly improves the ease of operator's operation of getting on/off the cabin 7.

Further, since the left-right direction width of the rear-side side plate 353 is set so as to be larger than the left-right direction width of the front-side side plate 352 (the vertically long portion 354), an operator is not obstructed by the existence of the front-side side plate 352 (the vertically long portion 354) when placing his or her foot on each of the tread steps 351, and in this respect, similarly, this configuration contributes to improvement of the ease of operator's operation of getting on/off the cabin 7. Further, since each of the rear-side side plates 353 has a large width, the influence of mud flashing by the rear wheels 4 is effectively reduced by the existence of the rear-side side plates 353.

Next, an air-conditioning structure inside and outside the roof assembly 306 will be described with reference to FIGS. 1, 2, 11, 14, 28, and 29. The roof assembly 306, which is disposed at the upper end side of the cabin frame 301, includes an outer roof 361, an inner roof 362, and the rear cover 363. The outer roof 361 serves as an external covering. The inner roof 362 constitutes the ceiling of the cabin 7. The rear cover 363 protrudes backward from the rear beam 304. The outer roof 361 covers the inner roof 362 and the rear cover 363 from the top to allow the inside of the roof assembly 306 to be hollow. Thus, the rear side of the outer roof 361 also extends backward from the rear beam 304. The concave portions 334 (outwardly bulging portions), in each of which a corresponding one of the front upper-side working lights 333 are set, are formed at the front side of the outer roof 361.

The inside of the roof assembly 306 is partitioned into two front-side and rear-side chambers by the inner roof 362 and the rear cover 363. A space at the side of the inner roof 362 corresponds to the front-side chamber, and a space at the side of the rear cover 363 corresponds to the rear-side chamber. An air conditioner 364 is contained at the rear-side chamber side (the side of the rear cover 363) of the inside of the roof assembly 306. The air conditioner 364 manages air conditioning inside the cabin 7. The air conditioner 364 performs heating using cooling water for the engine 5 and cooling using a compressor, a condenser, an evaporator, and any other device that are driven by the engine to adjust air conditioning (chamber interior temperature) inside the cabin 7. The air conditioner 364 is disposed at the side of the rear cover 363, protruding backward from the rear beam 304, so as not to make the entire height of the cabin 7 higher than a necessary height level. Particularly, in this embodiment, the rear upper-side support stays 335 are disposed not on the rear beam 304 but on the respective rear support pillars 302 to favorably ensure rear visibility from an operator, and further, a disposition space at the rear side of the roof assembly 306 (i.e., a disposition space located at the side of the rear cover 363 and used for containing the air conditioner 364) is ensured between the left and right rear upper-side support stays 335.

The rear cover 363 is coupled to the rear beam 304 of the cabin frame 300. Thus, the rear cover 363 and the air conditioner 364 are supported by the rear beam 304 of the cabin frame 300. A sealing material 365 is attached to the periphery of the rear cover 363. In a state in which the outer roof 361 is covered on and secured to the inner roof 362 and the rear cover 363, the sealing material 365 is in close contact with the inner face side of the outer roof 361, and as a result, the rear-side chamber side (the rear cover 363 side) of the inside of the roof assembly 306 is in a hermitically-sealed state.

The left and right side portions of the outer roof 361 are inclined in a state of being cut off in an obliquely downward direction toward inside portions of the left and right sides. An external-air intake opening 366 is formed in a side portion opposite a tailpipe 229 (see FIGS. 1 to 10) among the left and right side portions of the outer roof 361. This external-air intake opening 366 brings the rear-side chamber side (the rear cover 363 side) of the inside of the roof assembly 306 into communication with the outside. The tailpipe 229 allows exhaust gas from the engine 5 to be discharged to the outside through the tailpipe 229 itself. In this case, the tailpipe 229 is disposed at the front right side of the cabin 7 so as to stand upright, that is, extend from the below to the above along the right front support pillar 301. Meanwhile, the external-air intake opening 366 is formed at the rear left side of the outer roof 361 (i.e., at a portion facing the rear cover 363). The external-air intake opening 366 allows the air conditioner 364, which is disposed inside the rear cover 363, to face the external-air intake opening 366 itself from the left side via a communication opening (omitted from illustration) formed in the left side wall of the rear cover 363. A lattice-shaped ventilation frame assembly 367 is attached to the external-air intake opening 366. Although detailed illustration is omitted, a dust filter is attached to the communication opening, which is formed in the left side wall of the rear cover 363. Meanwhile, an internal-air intake opening 368 is formed in a portion located at the rear side of the inner roof 362 and facing the back of the head of an operator sitting on the steering seat 8. This internal-air intake opening 368 brings the inside of the rear cover 363 into communication with the inside of the cabin 7. A lattice-shaped ventilation frame assembly 369 is attached to the internal-air intake opening 368.

An internal/external air switching shutter plate 370 is disposed inside the rear cover 363. The internal/external air switching shutter plate 370 opens/closes the communication opening, which is formed in the left side wall of the rear cover 363. The internal/external air switching shutter plate 370 is configured to be pivoted to be opened/closed by the driving of an actuator 371. When the internal/external air switching shutter plate 370 is pivoted to be opened, the communication opening of the rear cover 363 is opened, and then, external air is guided into the rear cover 363 from the external-air intake opening 366 via the communication opening by the driving of the air conditioner 364, disposed inside the rear cover 363. When the internal/external air switching shutter plate 370 is pivoted to be closed, the communication opening of the rear cover 363 is closed to block the external air from entering from the external-air intake opening 366, and air inside the cabin 7 is guided into the rear cover 363 through the internal-air intake opening 368 by the driving of the air conditioner 364. In this embodiment, adjustment of an opening ratio (an opening/closing degree) of the internal/external air switching shutter plate 370 enables adjusting a proportion of the external air and the internal air, which are guided by the air conditioner 364, disposed inside the rear cover 363.

The upstream side of an air-conditioning duct 373 is coupled to an adjustment air discharge opening 372. This air-conditioning duct 373 has a fork shape in a plan view, and guides adjustment air from the rear-side chamber side (the rear cover 363 side) to the front-side chamber side (the inner roof 362 side). The adjustment air discharge opening 372 is formed at the front face side of the air conditioner 364. The upstream side of the air-conditioning duct 373 is located above the internal-air intake opening 368. The air-conditioning duct 373 penetrates the front face side of the rear cover 363 and the rear face side of the inner roof 362, and then is branched, in a fork shape, toward the left and right sides. Duct portions 374, fork-shaped portions of the air-conditioning duct 373, extend in a rectangular shape in a plan view along a rectangular frame constituted by the front beam 303, the rear beam 304, and the left and right side beams 305. Cooling/heating blowing openings 375 are disposed at both left and right side portions of the inner roof 362. One of the cooling/heating blowing openings 375 and one of adjustment shutter plates 376 are disposed at intermediate portions of each of the duct portions 374 of the air-conditioning duct 373. Each of the adjustment shutter plates 376 is used for adjusting a state of communication of a corresponding one of the cooling/heating blowing openings 375 with a corresponding one of the duct portions 374. The left and right adjustment shutter plates 376 are configured to be pivoted in conjunction with each other by an actuator 377 and a push-pull wire 378. The downstream sides of the respective duct portions 374 of the air-conditioning duct 373 are brought into communication with blowing openings 379. The blowing openings 379 are used for defogging, and are disposed at the front side of the inner roof 362. A fin (omitted from illustration) for use in adjustment of changing the air volume and the air direction of the adjustment air from the air conditioner 364 is disposed in each of the blowing openings 375 and 379.

Blocking of the flows of the respective duct portions 374 to the downstream sides (i.e., the block of the flows of the respective duct portions 374 to the defogging blowing openings 379) by the both left and right adjustment shutter plates 376 allows the adjustment air from the air conditioner 364 to be blown out through only the left and right cooling/heating blowing openings 375. Blocking of the flows to the left and right cooling/heating blowing openings 375 by the both left and right adjustment shutter plates 376 allows the adjustment air from the air conditioner 364 to be blown out through only the left and right defogging blowing openings 379. Adjustment of pivot angles of the both left and right adjustment shutter plates 376 enables adjusting the air volume of the adjustment air from the cooling/heating blowing openings 375 and the air volume of the adjustment air from the defogging blowing openings 379.

As clearly understood from the above description and FIGS. 1, 2, 11, 14, 28, and 29, in the working vehicle 1 including the cabin 7, which covers the steering seat 8 disposed on the vehicle machine body 2 and which includes the cabin frame 300 constituting a framework of the cabin 7, and the roof assembly 306 disposed at the upper end side of the cabin frame 300, the tailpipe 135, through which the exhaust gas from the engine 5 mounted on the travelling machine body 2 is discharged to the outside, is disposed at one of the left and right sides of the travelling machine body 2. Further, the inside of the roof assembly 135 is partitioned into two front-side and rear-side chambers, and the air conditioner 364 is contained in the rear-side chamber side (the rear cover 363 side). The external-air intake opening 366, which brings the rear-side chamber into communication with the outside, is formed in a side portion opposite the tailpipe 229 among left and right side portions of the roof assembly 306. This configuration, therefore, significantly reduces the possibility that the exhaust gas, discharged through the tailpipe 229, is taken into the external-air intake opening 366.

Further, the cabin frame 300 includes the pair of left and right front support pillars 301, the pair of left and right rear support pillars 302, the front beam 303, which couples between the upper end portions of the front support pillars 301, the rear beam 304, which couples between the upper end portions of the rear support pillars 302, the side beams 305, one of which couples between the upper end portions of the left front support pillar 301 and the left rear support pillar 302, these two support pillars being arranged in the front and rear direction, and the other of which couples between the upper end portions of the right front support pillar 301 and the right rear support pillar 302, these two support pillars being arranged in the front and rear direction. Further, the rear-side chamber, located at the rear cover 363 side of the roof assembly 306, is disposed so as to protrude backward from the rear beam support pillar 304; the rear-side chamber, located at the rear cover 363 side, is supported by the rear beam 304; and the rear upper-side working lights 337 are secured to the support stays 335, disposed at the upper end sides of the respective rear support pillars 302. This configuration, therefore, enables the air conditioner 364 to be contained in the inside of the roof assembly 306 without increasing the entire height of the cabin 7. Further, this configuration eliminates a situation in which a configuration in which the air conditioner 364 is contained in the rear-side chamber, located at the rear cover 363 side of the roof assembly 306, restricts front visibility from an operator. Further, the configuration, which allows the rear upper-side working lights 337 to be attached to the support stays 225, disposed at the upper end sides of the respective rear support pillars 302, not only enables a disposition space at the side of the rear-side chamber, located at the rear cover 363 side of the roof assembly 306, to be formed between the support stays 335 for both of the rear upper-side working lights 337, but also enables rear visibility from an operator to be favorably ensured.

FIGS. 30 to 36 illustrate a tractor 380, another embodiment of the present invention. Here, in the following description of the tractor 380, which is another embodiment of the present invention, components whose configurations and behaviors are similar to those of components of the aforementioned embodiment will be denoted by reference signs identical to those of the components of the aforementioned embodiment, and details description of such components will be omitted. This another embodiment is different from the aforementioned embodiment in a respect that, in substitution for the rear wheels 4, travelling crawler devices 381 support the rear portion of the travelling machine body 2.

In this case, the rear wheel shaft 20 is disposed so as to protrude outward in the left and right direction from each of the left and right rear wheel cases 19, and a driving circular member 382 and a swing link 383 are secured to the rear wheel shaft 20. The swing link 383 is swingable in a front and rear direction around the rear wheel shaft 20. A track frame 384 is disposed at the lower side of the swing link 383 so as to extend in the front and rear direction. The track frame 384 is coupled to the rear wheel shaft 20 via the swing link 383 so as to be swingable in the front and rear direction. A front driven circular member 386 is secured at the front end side of the track frame 384 via a tension adjustment mechanism 385. A rear driven circular member 387 is secured at the rear end side of the track frame 384 via a support shaft 388. A travelling crawler 389 is wound and hung around the three members, that is, the driving circular member 382, the front driven circular member 386, and the rear driven circular member 387, so as to form an approximately triangular shape. The travelling crawler 389 is a crawler track and is made of synthetic rubber. The tractor 1 is configuration to, to travel forward or backward, allow the driving circular members 382 (the rear wheels 20) to rotate in a positive or a reverse direction at an appropriate speed to allow the traveling crawlers 389 to be driven to positively rotate or be driven to reversely rotate. A plurality of rolling circles 390 are disposed under the track frame 384 so as to be rotatable.

Flights of steps 391 are each disposed so as be suspended at a corresponding one of left and right lower portions each included in the cabin 7 and located between a corresponding front wheel 3 and a corresponding travelling crawler 38, which are arranged in the front and rear direction. Each of the flights of steps 391 is used for operator's operation of getting on/off the tractor 1. In this another embodiment, each of the flights of steps 391 includes a plurality of tread steps 392 (two tread steps 392 in this embodiment), a front-side side plate 393, and a rear-side side plate 394. These front-side side plate 393 and rear-side side plate 394 support the tread steps 392. The front-rear direction positions of the plurality of tread steps 392 are displaced to positions different from one another such that the lower tread step a tread step 392 selected from among the tread steps 392 is, the more apart from the travelling crawler device 381 the front-rear direction position of the selected tread step 392 is. In this embodiment, a lower tread step 392 is located at a position displaced more forward than the displaced position of an upper tread step 392.

In this case, the upper end side of each of the front-side side plates 393 is bolt-secured to a corresponding one of bracket pieces 355. Each of the bracket pieces 355 is welded and secured to a corresponding one of the front support pillars 301. The front end side of the upper tread step 392 is secured to an upper-lower direction intermediate portion of the front-side side plate 393. A front-rear direction intermediate portion of the lower tread step 392 is secured to the lower end side of the front-side side plate 393. In this another embodiment, the rear-side side plate 394 is divided into two upper and lower portions so as to cause the number of the upper and lower portions to correspond to the number of the tread step 392. The upper end side of each of upper rear-side side plates 394a is bolt-secured to a corresponding one of ancillary frames 318. Each of the ancillary frames 318 couples a corresponding one of left and right fender frames 312 to a corresponding one of left and right bottom frames 311. The lower end side of the upper rear-side side plate 394a secures the rear end side of the upper-step side tread step 392. The upper end side of the lower rear-side side plate 394b secures the lower face of the upper-step side tread step 392. The lower end side of the lower rear-side side plate 394b secures the rear end side of the lower-step side tread step 392. Accordingly, the lower-step side tread step 392 is supported by the front-side side plate 393 and the lower rear-side side plate 394b in a cantilevered manner.

This configuration facilitates directing the movement of an operator who is getting on the cabin 7 to a backward and obliquely upward direction toward the steering seat 8 (that is, the configuration, which allows the front-rear direction positions of the tread steps 351 to be displaced to positions different from one another, enables the trajectory of movement of an operator to be guided toward the steering seat 8). Accordingly, this configuration significantly improves the ease of operator's operation of getting on/off the cabin 7. Further, there is a merit that the interference from the travelling crawler devices 381 (the travelling crawlers 389) on the flights of steps 391 is prevented with certainty.

Figure 36:
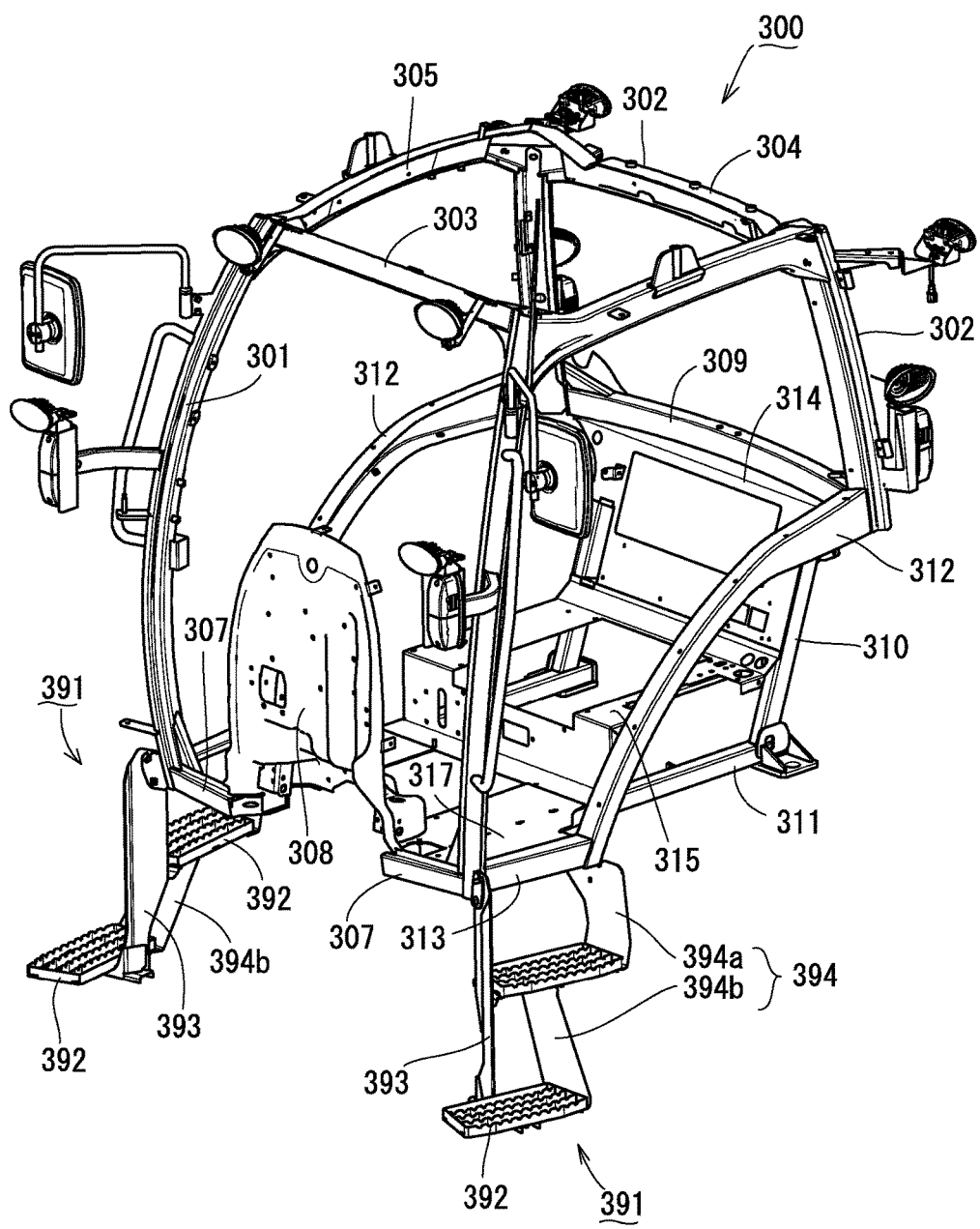
FIG. 36 is a perspective view of a cabin frame when obliquely viewed from a front and left side.

As shown in FIG. 36, the left-right direction widths of the upper rear-side side plate 394*a* and the lower rear-side side plate 394*b* are set so as to be larger than the left-right direction width of the front-side side plate 393. With this configuration, an operator is not obstructed by the existence of the front-side side plate 393 when placing his or her foot on each of the tread steps 392, and in this respect, similarly, this configuration contributes to improvement of the ease of operator's operation of getting on/off the cabin 7. Further, since each of the upper rear-side side plate 394*a* and the lower rear-side side plate 394*b* has a large width, the influence of mud flashing by the travelling crawler devices 381 is effectively reduced by the existence of the upper rear-side side plate 394*a* and the lower rear-side side plate 394*b*.

Figure 30:
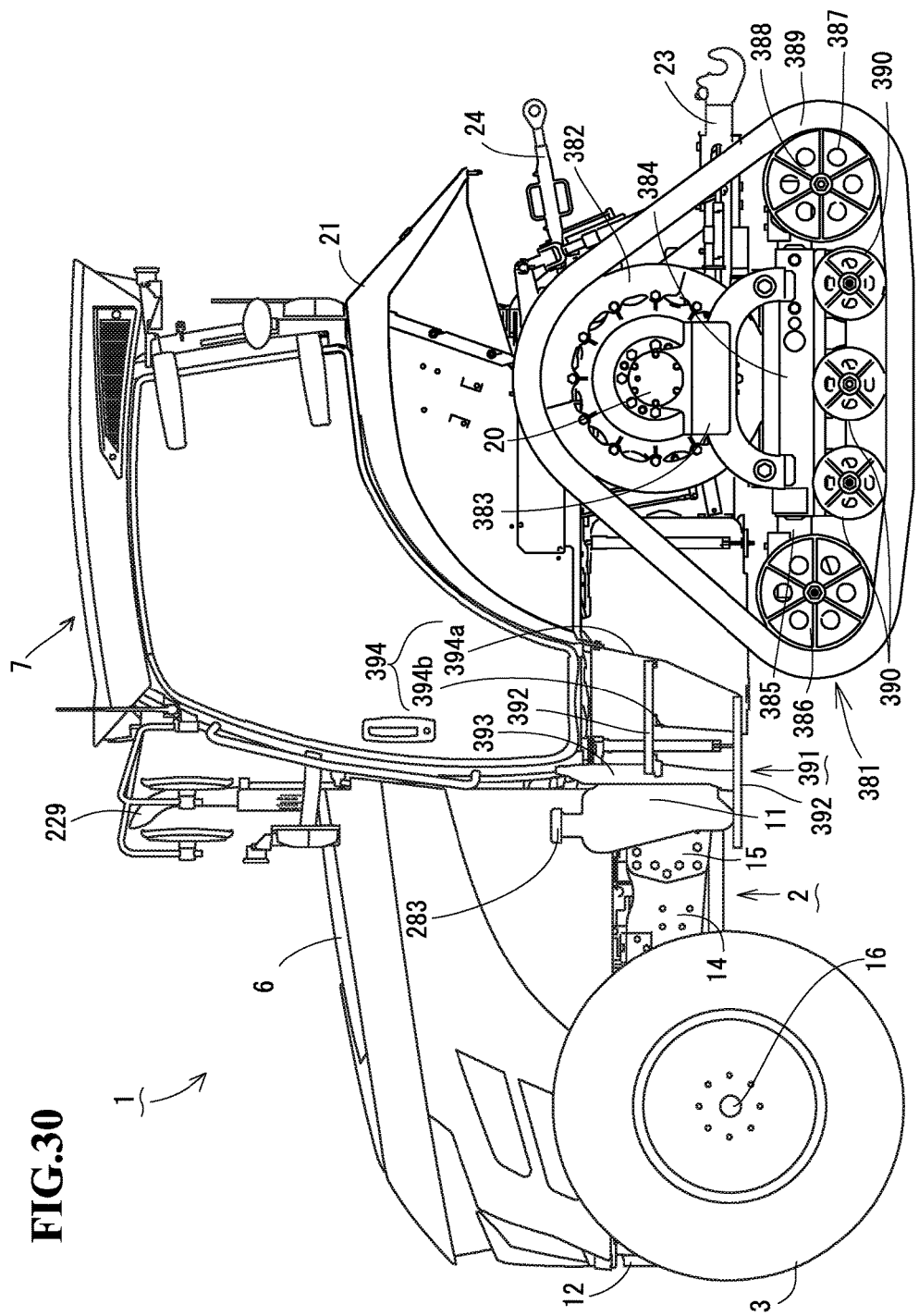
FIG. 30 is a left side view of a tractor, another embodiment of the present invention.
Figure 31:
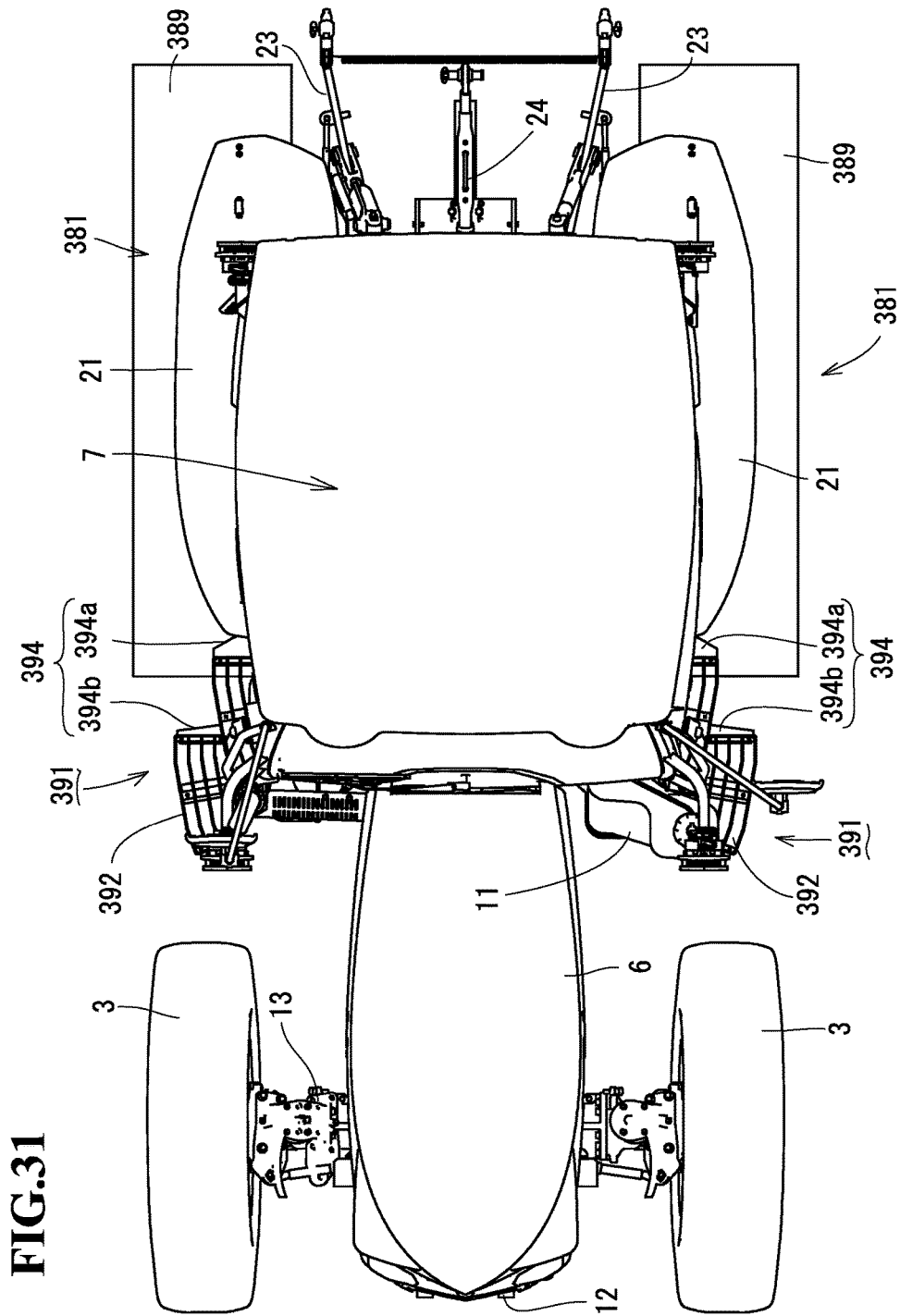
FIG. 31 is a plan view of the tractor.
Figure 32:
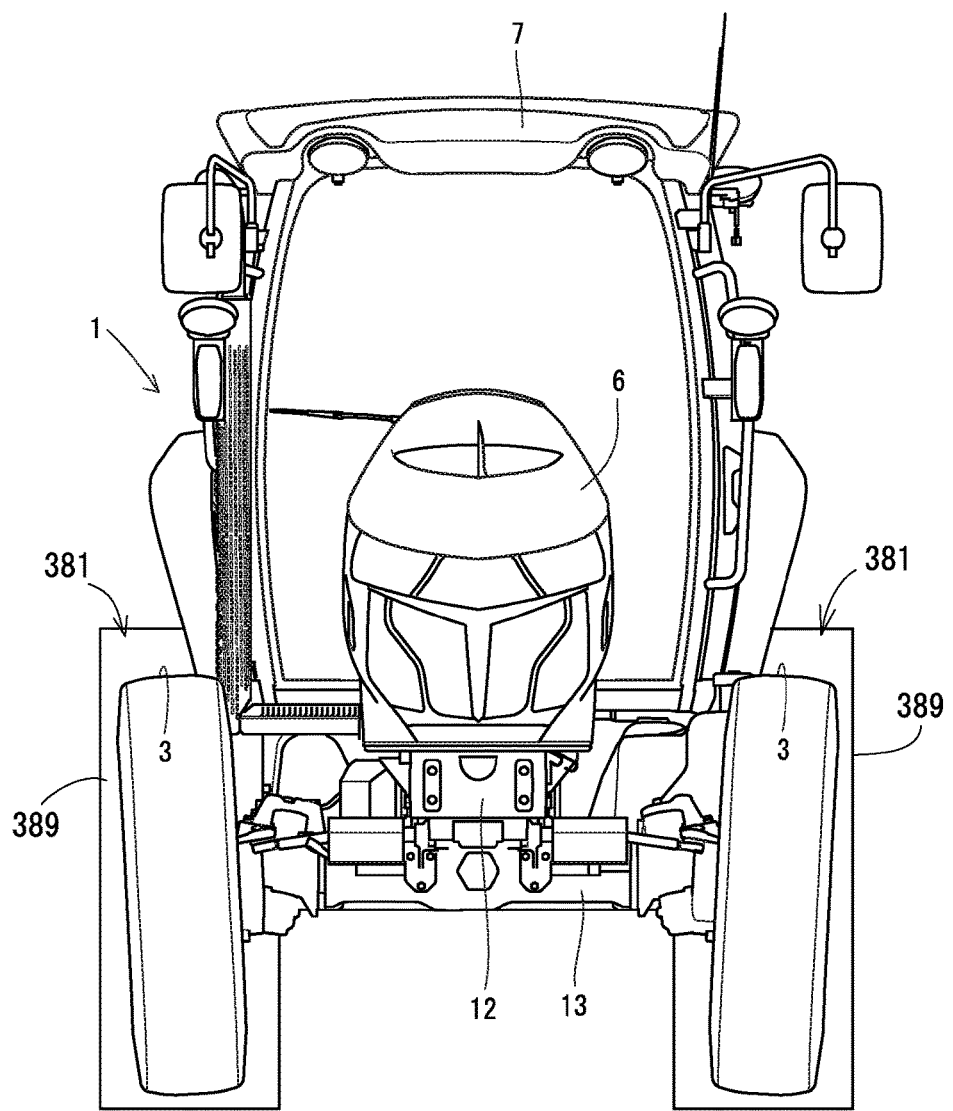
FIG. 32 is a front view of the tractor.
Figure 33:
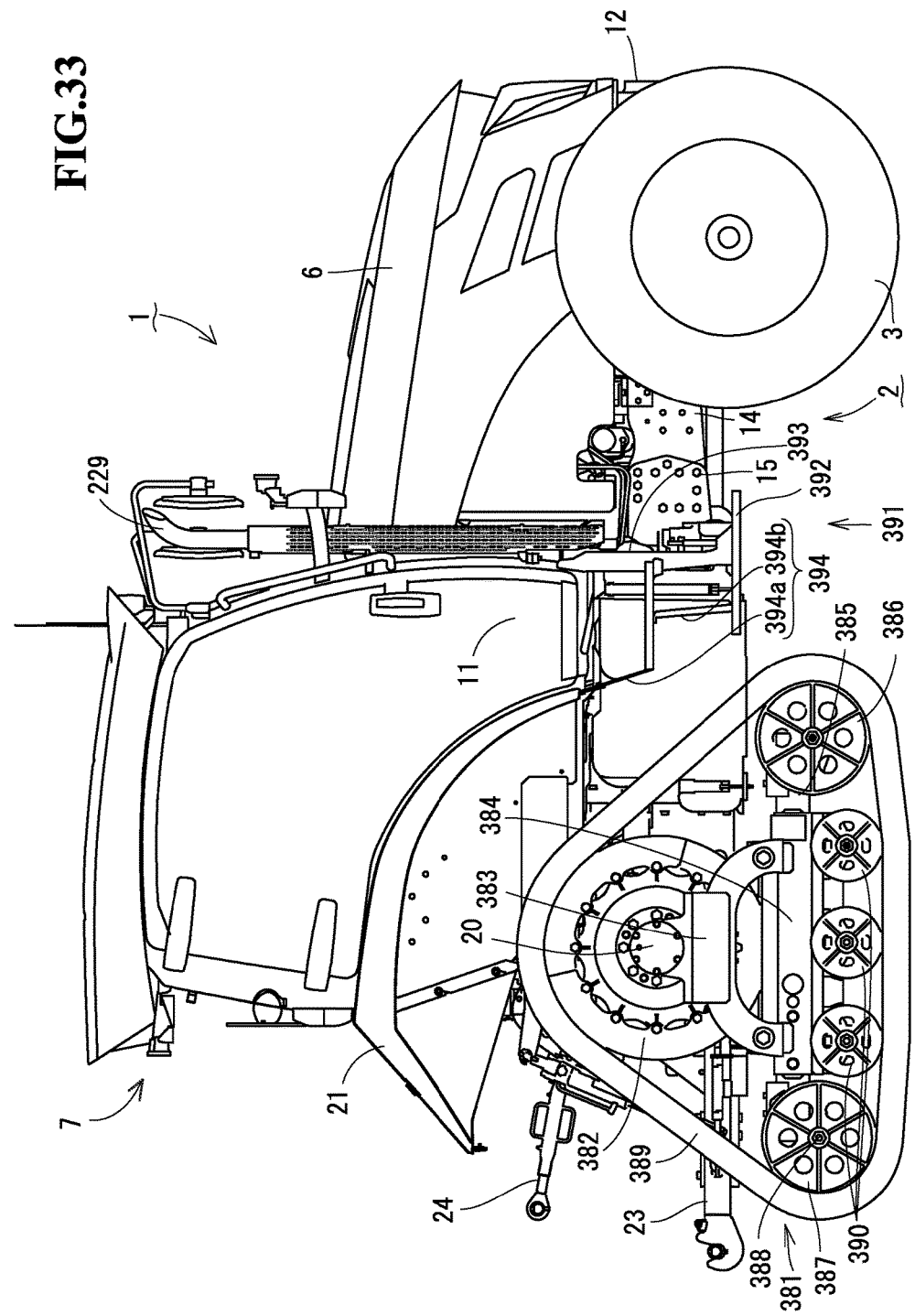
FIG. 33 is a right side view of the tractor.
Figure 34:
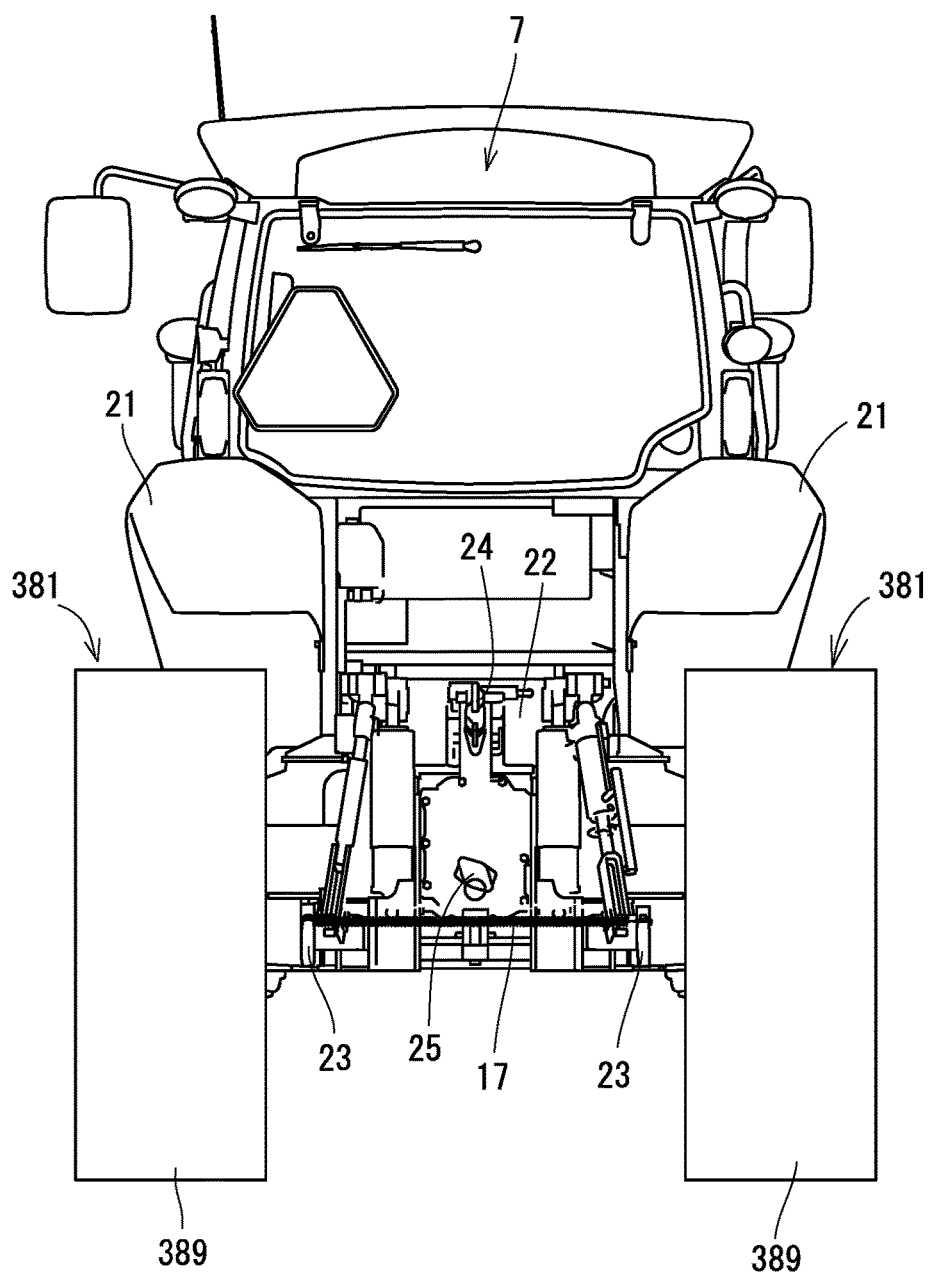
FIG. 34 is a rear side view of the tractor.
Figure 35:
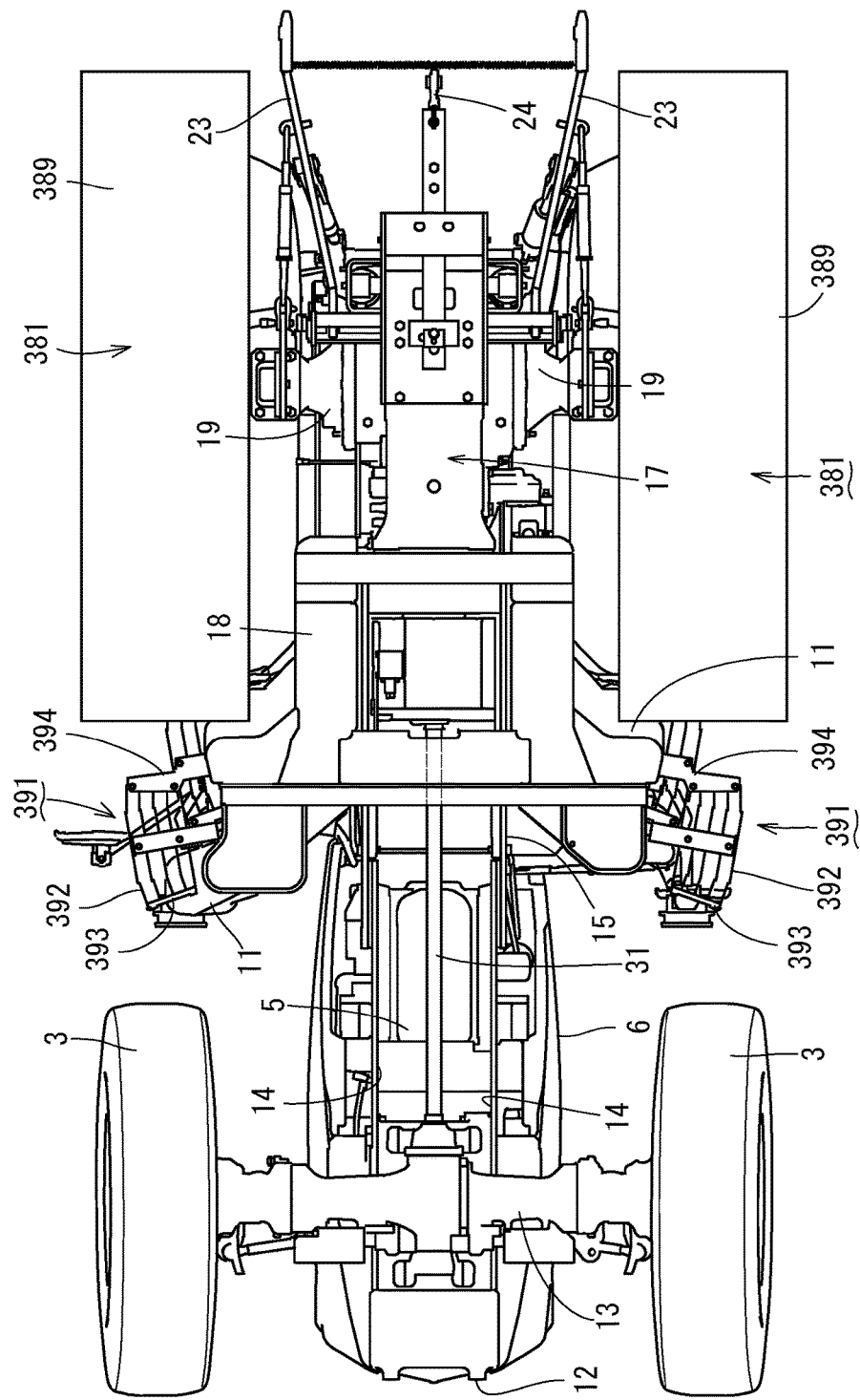
FIG. 35 is a bottom view of the tractor.

As shown in FIGS. 30 and 31, the two left and right fuel tanks 11 are disposed below the bottom of the cabin 7, and the left fuel tank 11 protrudes forward from the cabin 7 in a plan view. The protruding portion of the left fuel tank 11 is located between the travelling machine body 2 (the left machine body frame 15) and the lower tread step 392. Further, an upwardly protruding oil supply opening 283 is disposed at the upper side of the protruding portion. Thus, the lower tread step 392 is located adjacent to the oil supply opening 283, and this configuration enables supplying oil to the fuel tank 11 in a state in which an oil container is placed on the lower tread step 392. This configuration makes it unnecessary for an operator to lift the oil container to a high position. That is, this configuration facilitates supplying oil, and thus enables an operator to save labor. Moreover, the existence of the flights of steps 391 (i.e., the existence of the lower tread steps 392) minimizes the possibility that the side face of the fuel tank 11 is brought into contact or collision with an obstacle.

As clearly understood from the above description, and FIGS. 30 to 36, in a working vehicle 380, including the travelling machine body 2, which mounts the engine 5; the pair of left and right front wheels 3, which supports the front portion of the travelling machine body 2; the pair of travelling crawler devices 381, which support the rear portion of the travelling machine body 2; the cabin 7, which covers the steering seat 8 disposed on the travelling machine body 2; and the flights of steps 391, for use in operator's operation of getting on/off the cabin 7, the flights of steps 391 are each structured to be disposed and suspended at a corresponding one of left and right lower portions each included in the cabin 7 and located between a corresponding front wheel 3 and a corresponding travelling crawler device 381, which are arranged in the front and rear direction. Further, each of the flights of steps 391 includes the plurality of tread steps 392, and the side plates 393 and 394 (393, 394*a*, and 394*b*), which support the tread steps 392; the front-rear direction positions of the plurality of tread steps 392 are displaced to positions different from one another such that the lower tread step a tread step 392 selected from among the tread steps 392 is, the more apart from the travelling crawler device 381 the front-rear direction position of the selected tread step 392 is; and the lower tread step 392 is supported by the side plates 393 and 394 (394*b*) in a cantilevered manner. This configuration, therefore, allows the tread steps 391 to be positioned along the trajectory of movement of an operator toward the cabin 7, and thus, significantly improves the ease of operator's operation of getting on/off the cabin 7. Further, there is a merit that the interference from the travelling crawler devices 381 on the flights of steps 391 is prevented with certainty.

Further, the fuel tanks 11 are disposed at the lower left and right sides of the cabin 7, and the oil supply opening 283 of the fuel tank 11 is disposed between the travelling machine body 2 and the lower tread step 392. Thus, the lower tread step 392 is located adjacent to the oil supply opening 283, and this configuration enables supplying oil to the fuel tank 11 in a state in which an oil container is placed on the lower tread step 392. This configuration makes it unnecessary for an operator to lift the oil container to a high position. That is, this configuration facilitates supplying oil, and thus enables an operator to save labor. Moreover, the existence of the flights of steps 391 minimizes the possibility that an obstacle interferes with the side face of the fuel tank 11.

It is to be noted that the configurations of the individual portions in the present invention are not limited to the configurations described in the aforementioned embodiments and illustrated in the accompanying drawings, and may be variously modified within the scope not departing the gist of the present invention.

DESCRIPTION OF THE REFERENCE NUMERICAL

The embodiments of the present invention relates to working vehicles, such as a tractor for use in agricultural work and a wheel loader for use in civil engineering work.

What is claimed is:
1. A working vehicle comprising:
a travelling machine body;
a steering seat on the travelling machine body;
an engine on the travelling machine body;
a cabin covering the steering seat and comprising a cabin frame constituting a framework of the cabin, and a roof assembly disposed on an upper end of the cabin frame and comprising a front-side chamber and a rear-side chamber that are partitioned inside the roof assembly by an inner roof and a rear cover;
wherein the cabin frame comprises a pair of left and right front support pillars, a pair of left and right rear support pillars, a front beam coupling upper end portions of the front support pillars, a rear beam coupling upper end portions of the rear support beams, and side beams coupling the upper end portions of the front support pillars and the rear support pillars, which are arranged in a front and rear direction, and wherein
a side door is openably/closably secured to one of the rear support pillars via a pair of upper and lower hinges, and the roof assembly includes an outer roof as an exterior, the inner roof forming a ceiling of the cabin, and the rear cover which is connected to the rear beam and which protrudes rearward from the rear beam, the working vehicle further comprising an air conditioner inside the rear-side chamber, wherein the rear-side is a rear cover side, and wherein
a tailpipe disposed on one side among a left side and a right side of the travelling machine body extends along one of the front support pillars and is configured to allow exhaust gas from the engine to be discharged to an outside of the working vehicle through the tailpipe; and an external-air intake opening disposed at a location proximate to the rear cover on one side opposite the tailpipe among a left side and a right side of the outer roof is formed on a ventilation frame assembly, and is configured to bring the rear-side chamber into communication with the outside of the working vehicle.

2. The working vehicle according to claim 1,
wherein the rear-side chamber of the roof assembly is disposed so as to protrude from the rear beam, and is supported by the rear beam, and
wherein a rear upper-side working light is attached to a support stay disposed on an upper end side of each of the left and right rear support pillars.

3. The working vehicle according to claim 1, wherein at least one support stay to each of which at least one light fitment is attached is disposed on the cabin frame.

4. The working vehicle according to claim 3,
wherein the at least one support stay comprises a plurality of support stays, and the at least one light fitment comprises a plurality of light fitments,
wherein a first one of the plurality of support stays is disposed on an upper-lower direction intermediate portion of each of the front support pillars, and a front composite light and a front intermediate-side working light that serve as light fitments among the plurality of light fitments are attached to the first one of the plurality of support stays, and
wherein a second one of the plurality of support stays is disposed on a lower portion of each of the rear support pillars, and a rear composite light and a rear lower-side working light that serve as light fitments among the plurality of light fitments are attached to the second one of the plurality of support stays.

5. The working vehicle according to claim 1,
wherein a pair of left and right first support stays are each disposed on a corresponding one of long-length direction intermediate portions of the front beam, and front upper-side working lights are each attached to a corresponding one of the left and right first support stays, and
wherein second support stays are disposed on an upper end portion of a corresponding one of the rear support pillars, and rear upper-side working lights are each attached to a corresponding one of the second support stays.

6. The working vehicle according to claim 5, wherein the front upper-side working lights are located so as to overlap the front beam in a front view.

7. The working vehicle according to claim 1, wherein the external-air intake opening is positioned above the side door and at a position which is on an opposite corner of the cabin as the tailpipe when the cabin is viewed in plan view.

* * * * *